(12) United States Patent
Berlatzky et al.

(10) Patent No.: US 10,739,277 B2
(45) Date of Patent: Aug. 11, 2020

(54) OPTICAL SYSTEM AND METHOD FOR MEASUREMENTS OF SAMPLES

(71) Applicant: NOVA MEASURING INSTRUMENTS LTD., Rehovot (IL)

(72) Inventors: Yoav Berlatzky, Kibbutz Beit Guvrin (IL); Valery Deich, Jerusalem (IL); Dror Shafir, Kiryat Ono (IL); Danny Grossman, Herzliya (IL)

(73) Assignee: NOVA MEASURING INSTRUMENTS LTD., Rehovot (IL)

( * ) Notice: Subject to any disclaimer, the term of this patent is extended or adjusted under 35 U.S.C. 154(b) by 0 days.

(21) Appl. No.: 16/094,547

(22) PCT Filed: Apr. 21, 2016

(86) PCT No.: PCT/IL2016/050428
§ 371 (c)(1),
(2) Date: Oct. 18, 2018

(87) PCT Pub. No.: WO2017/183017
PCT Pub. Date: Oct. 26, 2017

(65) Prior Publication Data
US 2019/0128823 A1 May 2, 2019

(51) Int. Cl.
*G01N 21/956* (2006.01)
*G01N 21/88* (2006.01)
(Continued)

(52) U.S. Cl.
CPC ....... *G01N 21/956* (2013.01); *G01B 9/02007* (2013.01); *G01B 9/02022* (2013.01);
(Continued)

(58) Field of Classification Search
CPC ............. G01N 21/956; G01N 21/8806; G01N 21/9501; G01B 9/02007; G01B 2210/56
See application file for complete search history.

(56) References Cited

U.S. PATENT DOCUMENTS 5,568,256 A * 10/1996 Korner ................ G01B 9/025
356/512
6,249,351 B1 6/2001 De Groot
(Continued)

FOREIGN PATENT DOCUMENTS

WO 2015155779 A1 10/2015

*Primary Examiner* — Dominic J Bologna
(74) *Attorney, Agent, or Firm* — Browdy and Neimark, P.L.L.C.

(57) ABSTRACT

A measurement system is presented for use in metrology measurements on patterned samples. The system comprises: at least one light source device configured to generate broadband light, at least one detection device configured to provide spectral information of detected light, and an optical system. The optical system comprises at least an oblique channel system for directing incident light generated by the light source(s) along an oblique illumination channel onto a measurement plane, on which a sample is to be located, and directing broadband light specularly reflected from the sample along a collection channel to the detection device(s). The optical system further comprises an interferometric unit comprising a beam splitting/combining device and a reference reflector device. The beam splitting/combining device is accommodated in the illumination and collection channels and divides light propagating in the illumination channel into sample and reference light beams propagating in sample and reference paths, and combines reflected reference and sample paths into the collection channel to thereby create a spectral interference pattern on a detection plane.

21 Claims, 22 Drawing Sheets

(51) Int. Cl.
*G01N 21/95* (2006.01)
*G01B 9/02* (2006.01)

(52) U.S. Cl.
CPC ..... *G01N 21/8806* (2013.01); *G01N 21/9501* (2013.01); *G01B 2210/56* (2013.01)

(56) References Cited

U.S. PATENT DOCUMENTS

| | | |
|---|---|---|
| 6,713,753 B1 | 3/2004 | Rovira |
| 2001/0017697 A1 | 8/2001 | Kanda et al. |
| 2005/0068540 A1* | 3/2005 | De Groot ........... G01B 11/0675 356/512 |
| 2009/0015844 A1 | 1/2009 | De Groot |
| 2009/0091723 A1* | 4/2009 | Sasaki ................. B82Y 10/00 355/53 |

* cited by examiner (GENERAL ART)

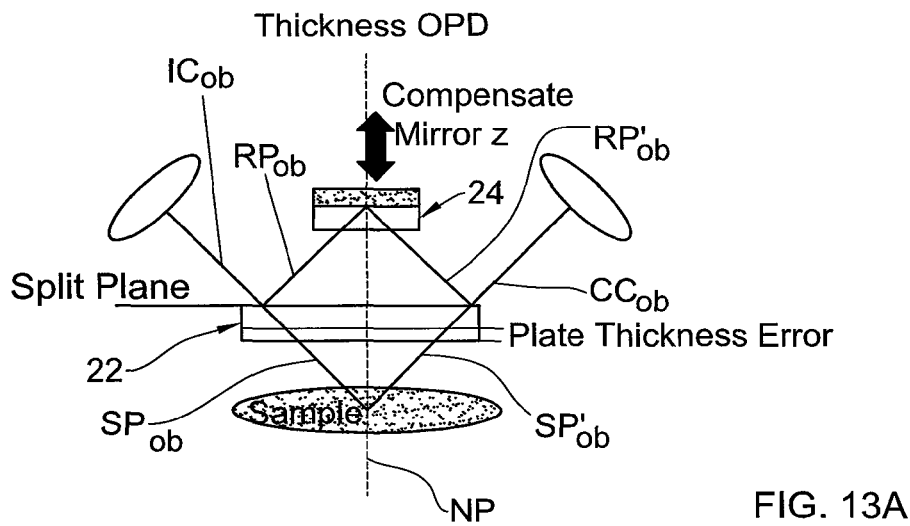
FIG. 13A
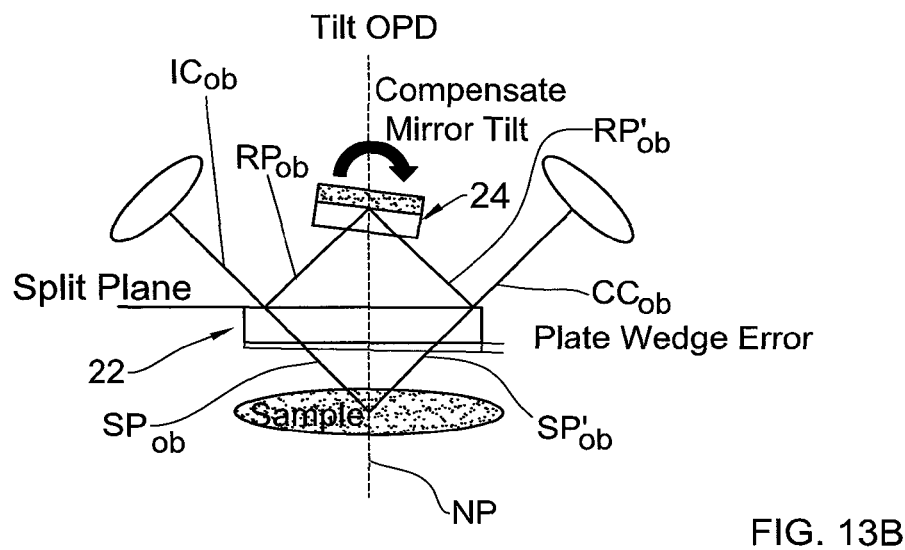
FIG. 13B
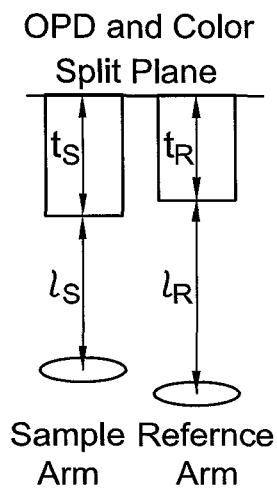 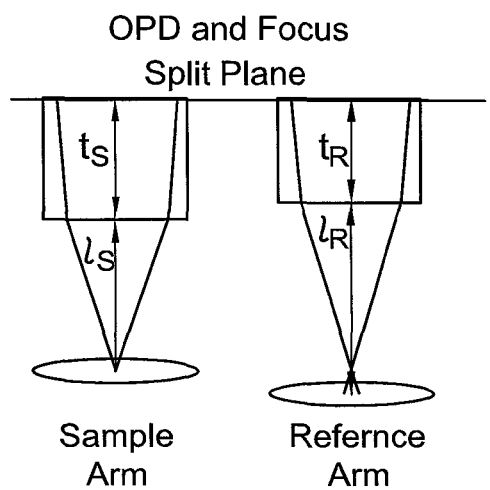
FIG. 14A          FIG. 14B

OPTICAL SYSTEM AND METHOD FOR MEASUREMENTS OF SAMPLES

TECHNOLOGICAL FIELD

The present invention is generally in the field of optical measurement systems, and relates to an optical system and method for measurement is various samples. The invention is particularly useful for metrology measurements in patterned structures, such as semiconductor wafers.

BACKGROUND

The constant progress in semiconductor technology demands for the fabrication of ever smaller devices. This development has to be accompanied by concurrent improvement in metrology capabilities, in order to monitor and control the fabrication process.

Over the last few decades, optical critical dimension (OCD) metrology has taken a pivotal role in semiconductor manufacturing process, due to its extreme sensitivity, accuracy, flexibility and speed. In order to provide adequate improvement of the metrology capabilities, OCD tools have gone through extensive improvement and refinement, and can provide today extremely accurate broadband spectral measurements and extremely high throughput.

In addition to the process of improving the basic tool characteristics, another venue by which OCD performance can be improved is through diversifying the measured information. Commonly measured optical properties are the reflectivity for different incidence angles, azimuths, polarizations and wavelengths. In addition, the relative phase between reflected TE and TM polarization components can be accessed through (e.g.) ellipsometric measurements.

Traditional optical wafer metrology tools rely on spectral reflectometry and/or ellipsometry. However, the electromagnetic field scattered from a sample also contains spectral phase information, which may be highly beneficial in extracting further or more accurate information from the measurements. This quantity describes the relative phase between the incident and reflected electromagnetic waves. Typically, this phase has different values for different wavelengths, incident angles\azimuths and polarizations.

Since accessing the phase directly is not possible at optical frequencies, one has to use interference effects, usually observed with an interferometer, and recover the encoded phase information from the interference effects. Most interferometers consist of a split optical path that is recombined to form interference fringes. One arm of the path is kept as a reference, and the other interacts with the sample. The interference signal from these two components is then used to extract the spectral phase, since the phase change incurred by the sample causes a change in the fringe pattern of the recombined beams that may be measured.

In many cases it is advantageous to perform optical wafer metrology measurements at oblique angles to the sample. Depending on the wafer stack and pattern type, measurements at oblique angles may provide additional information that improves the quality of information extracted from the measurements. This reasoning also carries over to interferometric measurements. As opposed to Ellipsometric phase, which provides relative phase on s and p polarizations, the Interferometric measurement provides phase relative to a well characterized reference mirror, and also provides absolute phase value or a change of phase of light returned from a sample relative to the original phase of incident light.

In conventional metrology tools, an oblique measurement scheme is usually implemented in a brightfield configuration with separate illumination and collection objectives set opposite each other so that the collection objective is aligned to receive the specular reflection from the sample. This is schematically illustrated in FIG. 1.

General Description

There is a need in the art for optimizing both spectral and interferometric measurements, thereby increasing the amount of information about a sample under measurements.

The present invention provides a novel optical system which utilizes oblique measurement scheme for a spectral interferometer. The optical system of the invention may be used in metrology measurements on patterned samples (e.g. semiconductor wafers), as well as in (phase sensitive) microscopes utilizing an oblique configuration.

The measurement system of the invention includes an optical system which is configured to define at least an oblique channel system (optical scheme). As noted above, in such optical scheme, incident light is directed from a broadband light source along an oblique illumination channel onto a measurement plane (where a sample is located), and broadband light specularly reflected from the sample is directed along a collection channel to a detection device (including a spectrometer). This optical system includes an interferometric unit typically including a beam splitting/combining device and a reference reflector device. The beam splitting/combining device splits incident light into sample and reference light beams propagating in sample and reference paths, and combines reflected reference and sample beams into the collection channel to enable creation of a spectral interference pattern on a detection plane.

The relative location of the measurement plane, splitting/combining surface(s) and reference reflecting surface (as well as other reflecting surface as used in some embodiments), and angular orientation of such surfaces with respect to an incidence plane and a normal plane are properly selected/controllably tunable to provide a desired relation between reference and sample arms in the interferometer, i.e. provide desired optical path difference between the reference and sample arms. The incidence plane is perpendicular to the measurement plane, and in the specular-reflection configuration includes the illumination and collection channels. The normal plane is a plane perpendicular to the measurement plane and to the incidence plane. The reference arm is formed by the optical path of the reference beam between the splitting and combining locations, and the sample arm is formed by the optical path of the sample beam between the splitting and combining locations.

In some embodiments, the beam splitting/combining device is configured to define one or more beam splitting surfaces and one or more beam combining surfaces located in different planes which are spaced-apart along an axis normal to the measurement plane and are substantially parallel to one another and to the measurement plane and reference reflective surface.

In some embodiments, the beam splitting/combining device may be configured to define at least one beam splitting surface and at least one beam combining surface located in the same plane substantially parallel to the measurement plane and to the reference reflective surface. In some embodiments, the interferometric unit is configured such that the reference arm forms a mirror image of the sample arm with respect to the plane containing the beam splitting and combining surfaces.

In some other embodiments, the beam splitting/combining device is configured to define at least one beam splitting surface and at least one beam combining surface located in spaced-apart relationship and oriented substantially symmetrically with respect to the normal plane.

The interferometric unit may be configured such that the sample and reference paths form a mirror image of the reflected sample and reference paths with respect to the normal plane.

In some embodiments, the beam splitter/combiner device comprises at least one pellicle structure comprising at least one partially-reflective region. In some examples, the partially-reflective region may be located on and extending along either one of its opposite surfaces. In some other examples of these embodiments, the pellicle structure comprises a first partially-reflective region located on a first of its opposite surfaces and being aligned with a substantially transmitting region on a second of the opposite surfaces, and a second partially-reflective region located on the second opposite surface and aligned with a substantially transmitting region in the first surface. In some other examples of these embodiments, the partially reflective region divides the pellicle structure into two substantially identical transmitting pellicles at opposite sides of said region. In yet further possible examples of these embodiments, the beam splitter/combiner device comprises first and second pellicles located in, respectively, the oblique illumination and collection channels, and each pellicle comprises the at least one partially-reflective region.

In some embodiments, the reference reflector device comprises at least one reflective surface, which may be oriented substantially parallel to the measurement plane or with a certain tilt configuration. The reference reflector device may be configured as pellicle structure, comprising the reflective surface on either one of its opposite sides.

In some embodiments, the system is configured to be selectively shiftable/modifiable between the oblique spectral interferometric mode and oblique spectral reflectometric mode, or concurrently/independently operable in both of these modes. Alternatively or additionally, the system may be configured to be selectively shiftable between the oblique spectral interferometric mode and normal-mode reflectometric measurements, or concurrently/independently operable in both of these modes. If the addition of normal channel configuration, for either one or both of spectral interferometric and reflectometric modes, the system may include additional light source and/or additional detector associated with the normal channel scheme.

In some embodiments, the system also includes one or more light propagation affecting elements controllably operable to selectively shift the system operation between different modes. This may for example be a blocking mechanism (shutter) controllably operable to selectively block the reference path of the interferometer, thus causing the system to operate in the reflectometric mode.

In some embodiments, the same beam splitter/combiner device is used for implementing both oblique—and normal-channel spectral interferometry. Also, in some embodiments, the same reference reflector device is used in both oblique—and normal-channel spectral interferometric measurements In some other embodiments, the normal channel optical system utilizes a separate beam splitter device, and possibly also a separate reference reflector.

In some embodiments, the optical system further comprises one or more folding reflecting surfaces located in at least one of the reference and reflected reference paths. This enables selective operation of the system in either one of the oblique spectral interferometric mode and oblique spectral reflectometric mode.

As indicated above, the system includes one or more driving mechanisms for controllably displacement of the system elements. The displacements include one or more of the following: displacing the measurement plane along the normal axis; and displacing at least one of reflecting and partially reflecting surfaces of the optical system. The controllable displacement(s) enables at least one of the following: adjusting an optical path difference between the reference and sample arms in the interferometric unit; and adjusting a shift of the system operation from a spectral oblique interferometric mode to one or more of spectral oblique reflectometric, spectral normal interferometric, and spectral normal reflectometric modes.

The driving mechanism associated with either one of the reflecting and partially reflecting surfaces of the optical system is configured for executing at least one of the following displacements of the respective surface: displacement along the normal axis; angular displacement/tilt in the incidence plane with respect to the measurement plane; and angular displacement/tilt with respect to the incidence plane.

The system also includes or is connectable to (via wires or wireless signal transmission of any known suitable type) a control unit. The control unit is configured and operable to receive and process measured data (from the detection device(s)), and to operate one or more of the driving mechanisms.

Thus, according to one broad aspect of the invention, there is provided a measurement system for use in metrology measurements on patterned samples, the system comprising: at least one light source device configured to generate broadband light, at least one detection device configured for providing spectral information of detected light, and an optical system comprising at least an oblique channel system configured to direct incident light generated by said at least one light source along an oblique illumination channel onto a measurement plane, on which a sample is to be located, and to direct broadband light specularly reflected from the sample along a collection channel to said at least one detection device, wherein said optical system comprises an interferometric unit comprising a beam splitting/combining device and a reference reflector device, the beam splitting/combining device being accommodated in said illumination and collection channels and configured to divide light propagating in the illumination channel into sample and reference light beams propagating in sample and reference paths, and combine reflected reference and sample paths into the collection channel to thereby create a spectral interference pattern on a detection plane defined by said at least one detection device.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 9A-9E show the optical systems having symmetrical light propagation scheme with respect to the normal plane, and FIG. 9F exemplifies a system with an offset position of the reference reflector device;

FIG. 12A shows the use of (z+tip/tilt) displacement of the reference reflector device, FIG. 12B shows an example of the entire interferometer assembly (i.e. the beam splitting/combining surface(s) and the reference reflecting surface) being located on a z+tip/tilt stage; FIG. 12C shows a general asymmetric configuration using beam splitter combiner formed by spaced-apart separate splitting and combining elements and degrees of freedom placed on the reference mirror z+tip/tilt movement, and FIG. 12D shows an example where degrees of freedom (z+tip/tilt) are placed on each individual component of the system;

FIGS. 13A and 13B exemplify how errors in the thickness (FIG. 13A) or wedge (FIG. 13B) of the beam splitting/combining plate are compensated by displacement of the reference reflector;

FIGS. 14A and 14B illustrate the principles of temporal coherence reduction by longitudinal color introduced by the reference reflector compensation;

DETAILED DESCRIPTION OF EMBODIMENTS

Figure 1:
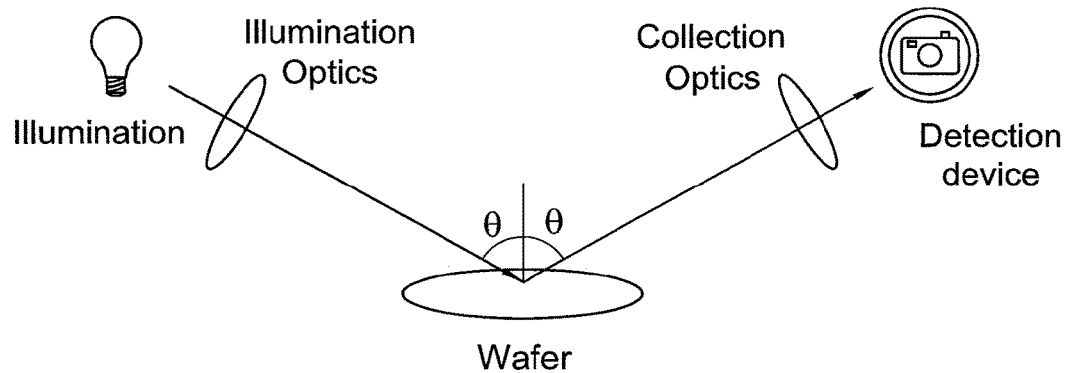
FIG. 1 is a schematic illustration of the general art oblique specular reflection light propagation scheme.

FIG. 1 illustrates the general configuration of oblique incidence optical scheme. As indicated above, the present invention provides a novel optical system which utilizes oblique measurement scheme implemented in a spectral interferometer.

Figure 2:
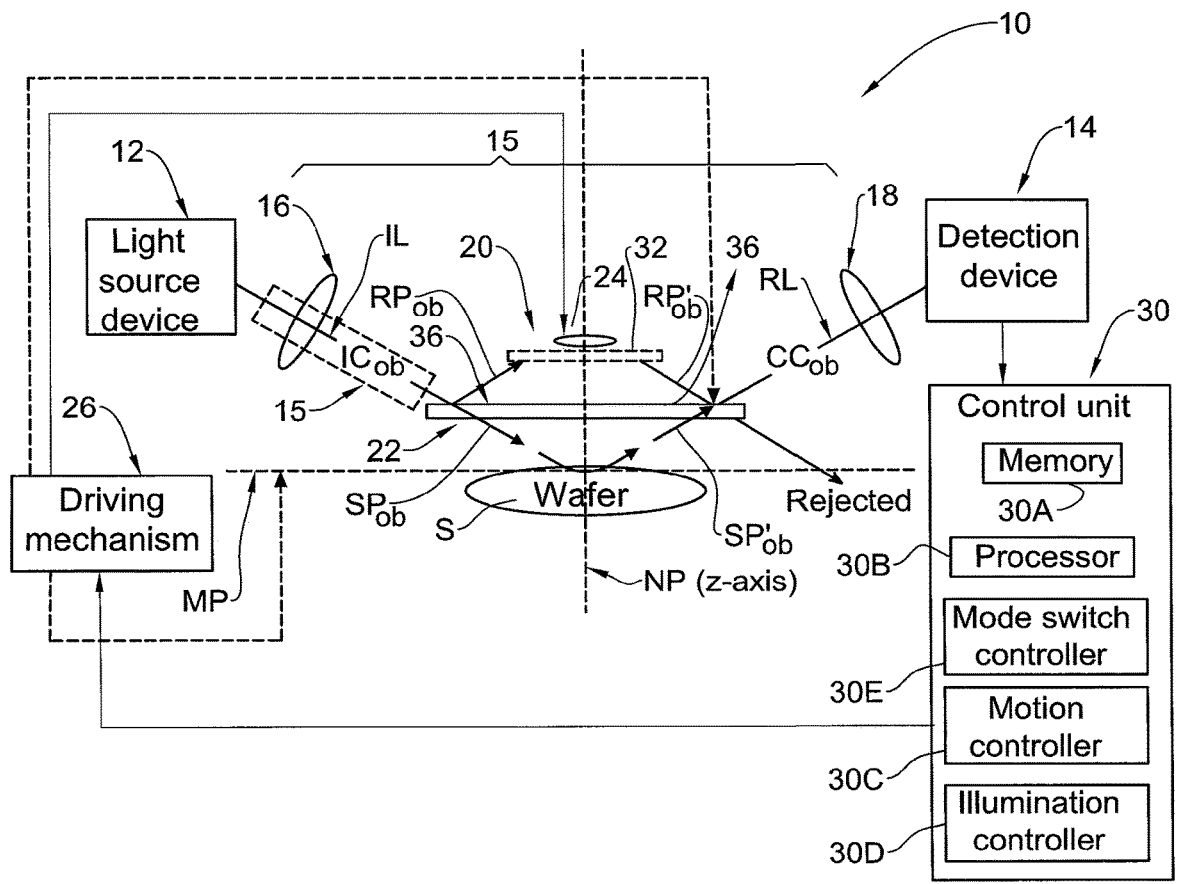
FIG. 2 is a schematic illustration of a measurement system of the invention utilizing an optical system having at least an oblique spectral interferometric unit.

This oblique incidence interferometric system is schematically illustrated in FIG. 2 being generally designated 10. System 10 includes a light source device 12 (generally, at least one light source device), a detection device 14 (at least one detection device), and an optical system which includes at least an oblique channel system 15.

The oblique channel system 15 is configured to direct input light IL from the light source 12 along an oblique illumination channel $IC_{ob}$ towards a measurement plane MP (where a sample S, e.g. wafer, is to be located (e.g. wafer's surface), i.e. the illumination channel of a certain non-zero angle of incidence; and to direct light RL reflected from the measurement plane MP (sample) to propagate along an oblique collection channel $CC_{ob}$ towards the detection device 14. The optical system 15 typically includes an oblique-channel illumination optics 16 (e.g. objective lens unit formed by one or more lenses) and an oblique-channel collection optics 18 (one or more lenses).

According to the invention, the optical system 15 is configured to define an interferometer unit 20, which enables to perform at least oblique spectral interferometric measurements. The interferometer unit 20 includes a beam splitter device 22 and a reference reflector device 24. The beam splitter device 22 is configured to split the oblique illumination channel $IC_{ob}$ into a sample path $SP_{ob}$ and a reference path $RP_{ob}$ and combine reflected reference path $RP'_{ob}$ and reflected sample path $SP'_{ob}$ into the collection channel $CC_{ob}$. By this, a spectral interference pattern can be created on a detection plane defined by the detection device 14.

Interference effects between a reference arm, formed by paths $RP_{ob}$ and $RP'_{ob}$, and a sample arm, formed by paths $SP_{ob}$ and $SP'_{ob}$, may be obtained on the detection plane if these reference and samples' arms satisfy a matching condition. The matching condition is satisfied when the optical lengths of the reference and sample arms are substantially equal, i.e. $(RP_{ob}+RP'_{ob})=(SP_{ob}+SP'_{ob})$, or the optical path difference (OPD) between the reference and sample arms is minimized. To this end, the system 10 further includes one or more driving mechanisms, generally at 26, associated with one or more of the reference reflector device 24, the measurement plane MP, and splitting/combining surface(s) of the beam splitter device 22. The driving mechanism is controllably operated to perform relative displacement of either one or more of these surfaces/elements. This will be described more specifically further below.

As shown in the figure in dashed lines, the optical system 15 may further include a light propagation affecting device, generally at 32, for selectively affecting light propagation in the reference arm, e.g. blocking light propagation in at least one of reference or reference reflected paths $RP_{ob}$ and $RP'_{ob}$. This allows for switching/shifting the system operation between spectral interferometric and spectral reflectometric modes/measurements. This will also be described more specifically further below.

The system 10 includes a control unit 30, which is connectable (via wires or wireless signal transmission using any known suitable technique) to the detection device(s) 14 to receive and process measured data). The control unit 30 is typically a computer system including inter alia data input and output utilities (now shown), memory 30A, data processor utility 30B, and also includes a motion controller 30C associated with one or more of the driving mechanisms 26. The control unit 30 may also illumination controller 30D. As indicated above, the system may be selectively operable in different measurement modes. To this end, the control unit may include a mode switch controller 30E associated with the light propagation affecting device 32. The processor utility 30B is configured (preprogrammed) to process the measured interferometric data (interference pattern) to extract information about the sample, utilizing model-based interpretation of the measured data (i.e. comparing measured spectral data to theoretical spectral data and searching for the best fit condition). Considering the system operation in different measurement modes, i.e. spectral interferometric and spectral reflectometric modes/measurements, the processor utility 30B is also capable of processing measured reflectometric data to extract information about the sample, utilizing suitable model-based interpretation of the reflectometric data.

The processing of the measured data includes a fitting procedure between the measured data and a selected theoretical model. Typically, the fitting process includes merit function definition. The merit function is a measure of the degree of fit between calculated (theoretical) and measured data. The merit function may be the RMS error between measurement and calculation data pieces, where each of the measurement and calculation data pieces is in the form of reflected intensity I and phase $\varphi$ simultaneously. For example, each of the reflected intensity and phase may be a function of the wavelength(s) used in the measurements, polarizations and incident\reflected angles. Other types of data can be presented and interpreted e.g. complex electric field components or sin/cos of the measured phase. Examples of such measurement and data processing technique are described in WO 2015/155779, which is assigned to the assignee of the present application and is incorporated herein by reference.

In the present non-limiting example of FIG. 2, the beam splitter/combiner device 22 includes a beam splitting/combining surface 36 accommodated in the illumination and collection channels $IC_{ob}$ and $CC_{ob}$ being downstream of the illumination optics 16 (with respect to a direction of propagation of illuminating light) and upstream of the collection optics 18 (with respect to a direction of propagation of reflected light). Generally, the beam splitting/combining surface 36 may be constituted by spaced-apart splitting and combining regions (being in the same plane or not) located in respectively the illumination and collection channels. Such configurations will be exemplified more specifically further below.

The beam splitting/combining region is typically a partially (semi) reflective element. Such partially transparent/reflective element (surface/region) 22 splits light IL from the illumination channel 16 by transmitting light portion $SP_{ob}$ to the sample path and reflecting light portion $RP_{ob}$ to the reference path $RP_{ob}$ to propagate towards respectively the measurement plane MP and the reference reflector device 24. Respective reflected sample light portion $SP'_{ob}$ and reflected reference light portion $RP'_{ob}$ are reflected back to the beam-splitter plate 22 where they are recombined to propagate along the collection channel $CC_{ob}$. As shown in the figure, a part of the reflected light is "rejected" by the partially reflective beam splitter plate, i.e. is directed to propagate outside the collection channel.

In the present not limiting example, the beam splitter device 22, i.e. its partially reflective surface(s) 36, is located between the measurement plane MP and a reflective surface of the reference reflector device 24. Also, in the present examples, the partially reflective surface(s) of the beam splitter device 22 is/are oriented substantially parallel to the measurement plane MP and to the reflective reference surface 24.

In the embodiment of FIG. 2, the interferometric unit 20 is configured such that the reference arm ($RP_{ob}$ and $RP'_{ob}$) is a mirror image of the sample arm ($SP_{ob}$ and $SP'_{ob}$) with respect to the beam splitting/combining surface 36. Also, in the embodiment exemplified in FIG. 2, the illumination interferometric arm (formed by sample and reference paths $SP_{ob}$ and $RP_{ob}$) and the collection interferometric arm (formed by reflected sample and reflected reference paths $SP'_{ob}$ and $RP'_{ob}$) are symmetrical about a normal plane NP, which is the plane normal to the measurement plane and to the incidence plane (the latter being a plane including the illumination and specular reflection channels). In this configuration, normal plane NP (being a plane of symmetry) passes through the reference reflecting surface.

In some embodiments, as will be described below, the system of the invention utilizes a combination of oblique and normal light propagation schemes, including any combination of normal and oblique interferometric and reflectometric configurations. The control unit (processor utility) is configured for processing the so-detected measured data of different types and determine various parameters of the sample. As described above, the processing of the measured data includes fitting procedure between the measured data and a theoretical model, for both interferometric and reflectometric configurations.

The beam splitter/combiner device, as well as the reference reflector device may include one or more pellicles. In certain cases, the combination of oblique angle and moderate numerical aperture (NA) allows acceptable aberrations with a thin enough pellicle. This is exemplified in FIGS. 3A-3E. To facilitate understanding, the same reference numbers are used for identifying functional components which are common in all the examples.

Figure 3A:
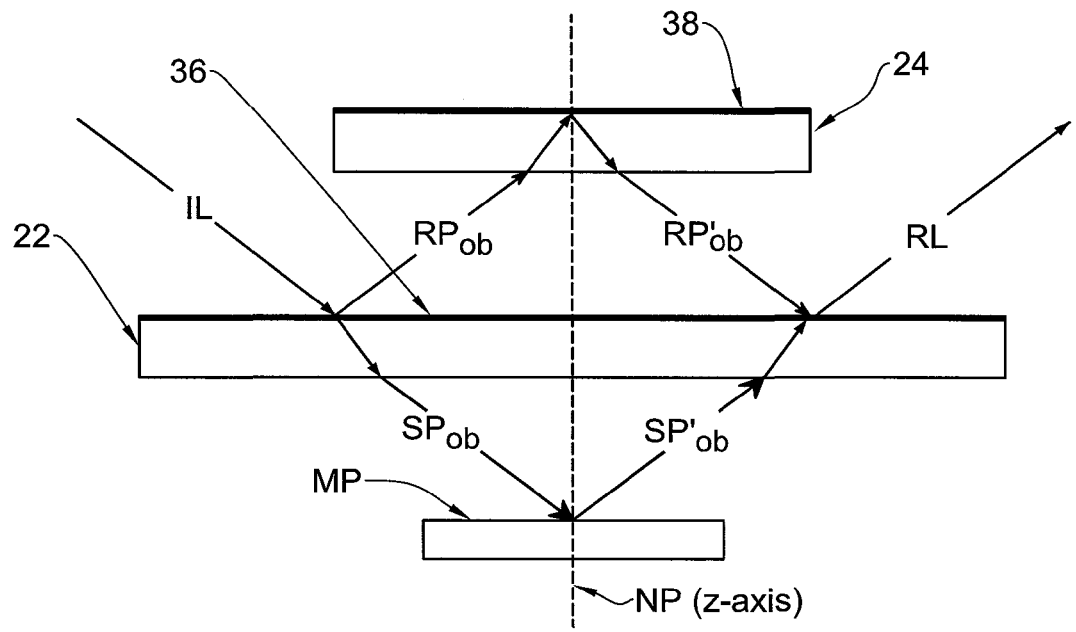
FIGS. 3A-3E schematically illustrate light propagation schemes in an oblique interferometric unit using various pellicle-based configurations of the beam splitter/combiner device and reference reflector device.

In the example of FIG. 3A, the beam splitter device 22 is formed by a single pellicle having a partially reflective (splitting/combining) surface 36 on one of its sides parallel to the measurement plane. This may be obtained by coating the pellicle on its one side with appropriate partially reflective layer/film. In the present non limiting example, the reference reflector device 24 is also formed by a single pellicle having a reflective film/coating 38 on its upper surfaces, such that light interacting with this reflective passes through the pellicle.

Since the beam splitting/combining pellicle 22 has finite thickness, matching the optical path difference (OPD) between the reference and sample arms entails adding a similar plate to the reference arm. The reflection from the beam-splitter plate 22 is from the top surface 36, and the reflection from the reference plate 24 is also from the top surface 38. Thus, light IL from the illumination channel is incident on the splitting/combining surface 36 which divides it into a reference path $RP_{ob}$ (reflected from surface 36) and sample path $SP_{ob}$ (transmitted through the pellicle 22). Light in the reference path $RP_{ob}$ is reflected from the reference surface 38 back to the combining surface 36; and light in the sample path $SP_{ob}$ is reflected from the sample in the measurement plane to the combining surface 36, where the reflections of reference and sample beams are combined into the combined light RL propagating in the collection channel.

Thus, the sample arm has two passes through the beam-splitter plate 22, and the reference arm also has two passes through the reference plate 24. This ensures that the optical path length difference (OPD) between both arms remains matched throughout the spectral range, since both arms (reference and sample) have the same propagation distance in both air and glass/beam-splitter medium.

In the examples described herein, the beam splitter/combiner medium is referred to as "glass". It should, however, be understood that the invention is not limited to this specific example, and pellicles may be fabricated from any other suitable material compositions.

Figure 3B:
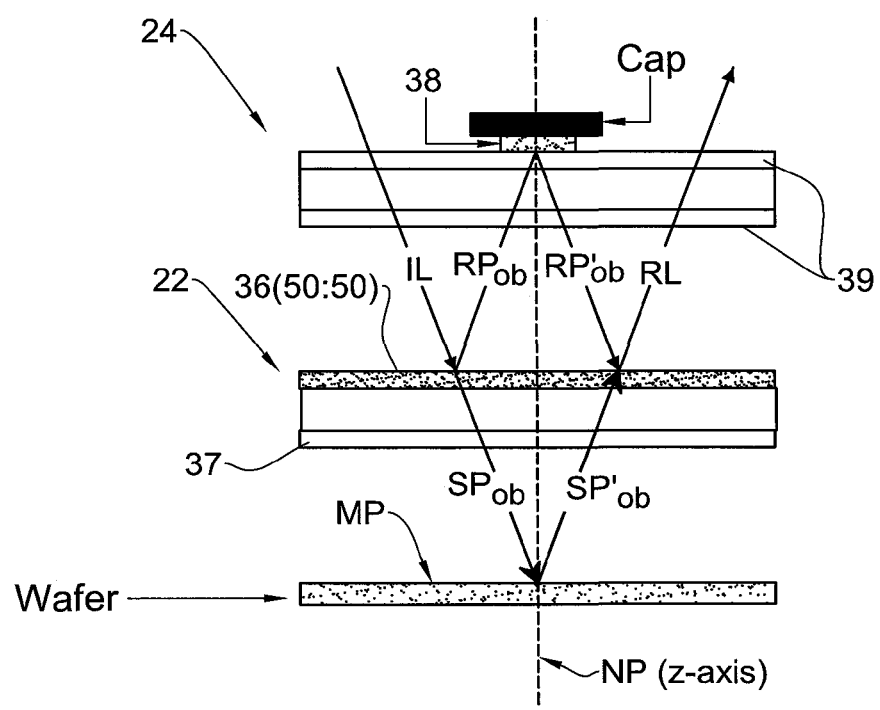

In this connection, reference is made to FIG. 3B exemplifying the beam splitter/combiner 22 which has a beam splitting combining surface 36 (partially reflective surface/coating with a properly selected/tuned ratio of transmittance and reflectivity to better match low or high reflective samples) on its top side whilst the bottom side thereof has an anti-reflective (AR) coating 37. The reference plate/pellicle structure 24 has an AR coating 39 on both sides thereof with a small patch of highly reflective (HR) coating deposited at its center to serve as the reference reflecting surface 38. The small reflective patch 38 in the center is similar to that which is used in a conventional Mirau objective, and it allows usage of this implementation also for the normal channel, as will be described further below.

Figure 3C:
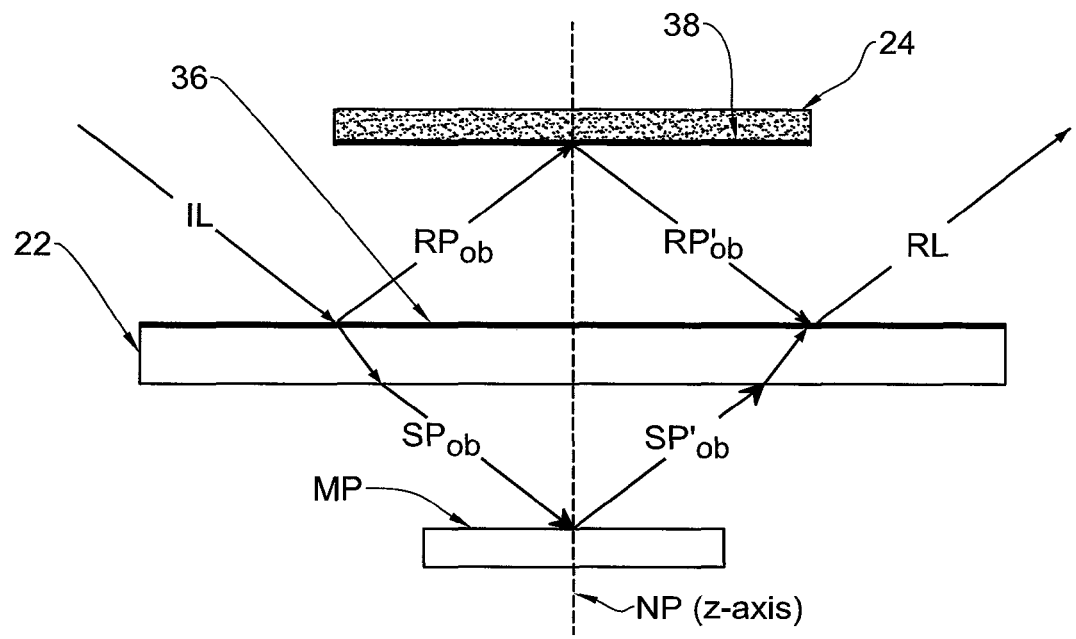

FIG. 3C shows a generally similar configuration, namely the single-pellicle beam splitter/combiner 22. However, in this example, reference reflector device 24 may not utilize a pellicle, but may just be any planar reflecting element (mirror); or may utilize a pellicle structure with a reflecting surface 38 made on the lower side of the reflector-pellicle, and thus the reference beam does not propagate inside the reflector-pellicle. In this configuration, i.e. with the planar mirror or pellicle with reflector on its bottom surface, allows the reflector to be of any thickness, and even to have an opaque substrate.

In general, the height of the reference reflecting surface (position along the axis NP normal to the measurement plane MP, i.e. z-axis position) is adjusted so that the oblique reflected reference and sample beams that are recombined at the right-hand side of the beam splitter/combiner are coincident (to ensure coherence between the arms). This requirement causes the arms to have different OPD (due to the oblique geometry).

If the spectrometer resolution is high enough (or a narrow-band source is used), this OPD difference is still smaller than the spectrometer's (source's) coherence length, allowing interference fringes to be observed with this simplified design.

Figure 3D:
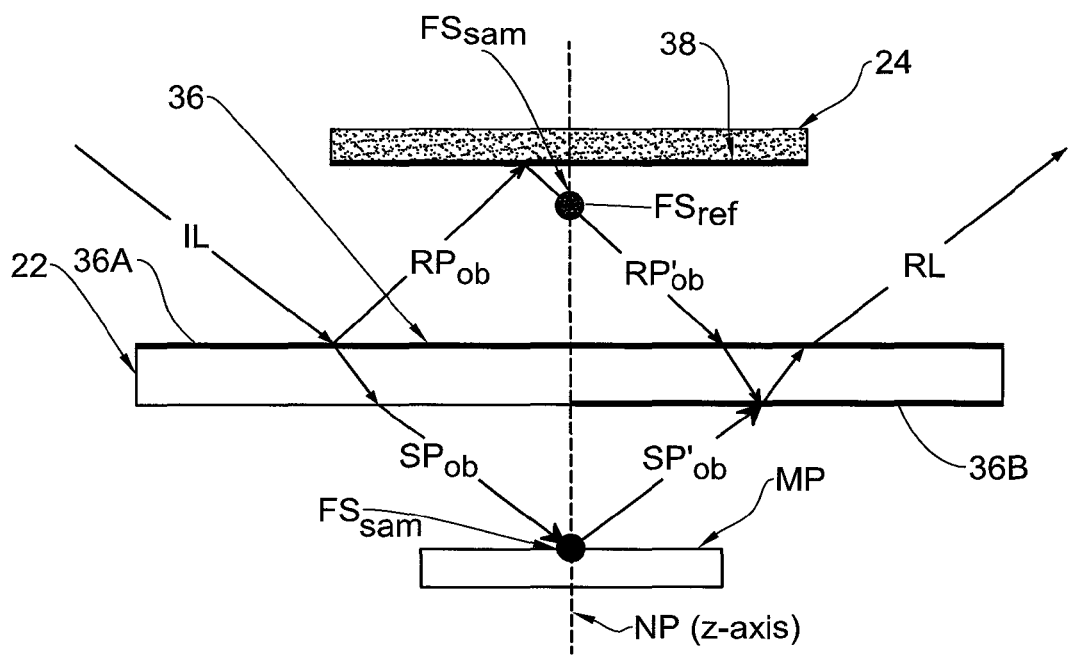

FIG. 3D exemplifies the single-pellicle based configuration of the beam splitter/combiner 22, distinguishing from the above two examples in that the beam splitting/combining surface 36 is constituted by a beam splitting region 36A on the upper side of the pellicle 22 and a bean combining region 36B on the lower side of the pellicle 22. This is a so-called single "step" pellicle. As for the reference reflector device 24, it may be any planar reflecting element (mirror); or may utilize a pellicle structure with a reflecting surface 38 made on the lower side of the reflector-pellicle.

The "step" pellicle has the partially-reflective coating on the top surface on one half and on the bottom surface on the other half. This ensures that both the reference arm (formed by paths $RP_{ob}$ and $RP'_{ob}$) and the sample arm (formed by paths $SP_{ob}$ and $SP'_{ob}$) have matched propagation lengths in air and glass, ensuring good broad-band performance. This design also allows the use of a simpler reference reflector, of any thickness, and even to have an opaque substrate.

Another advantage of this configuration is that for the sample arm in-focus position (sample arm spot $FS_{sam}$ is focused on the measurement plane), the reference arm spot $FS_{ref}$ is not focused on the reference mirror 24, thus decreasing sensitivity to any defects (e.g. scratch-dig) or contamination on the mirror surface. It should be noted that in the previously described examples, the sample and reference arms are symmetrical, so that when the sample arm spot $FS_{sam}$ is focused on the sample (wafer), it is also focused on the reference mirror 24. This design can also be used to improve recombined beam alignment using reference mirror tip/tilt, as will be described more specifically further below. As will be described further below, the "step" pellicle design of FIG. 3D can be used in the normal channel as well.

Figure 3E:
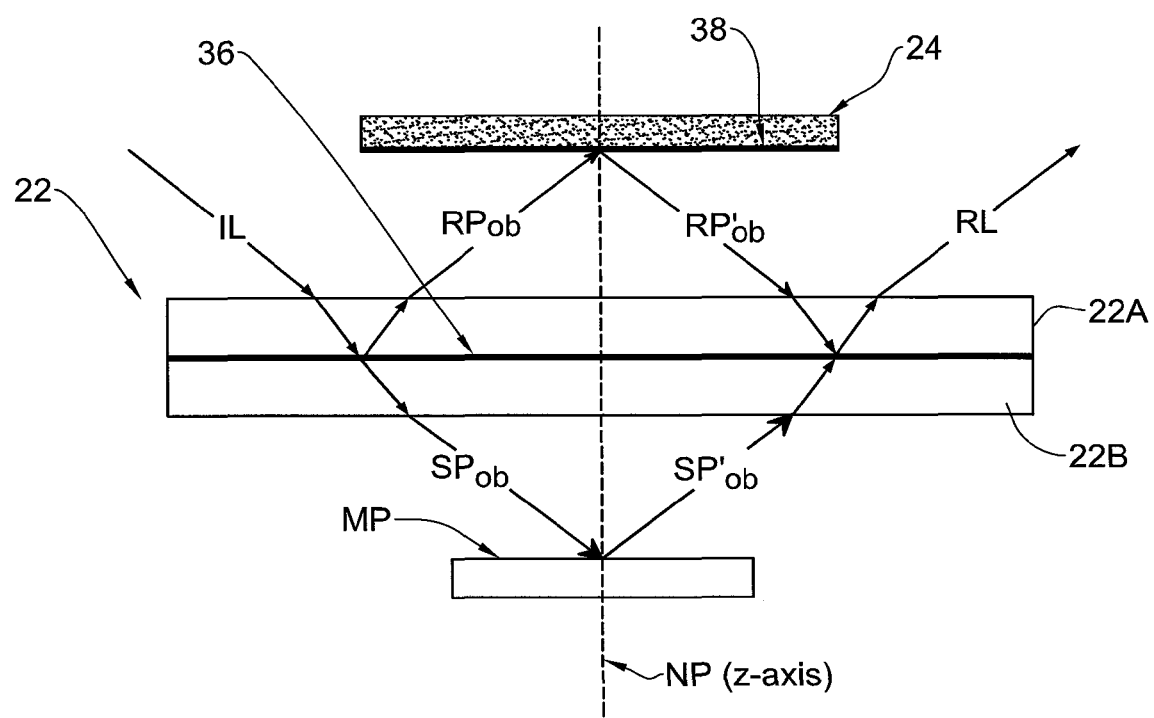

FIG. 3E exemplifies a double-pellicle configuration of the beam splitter/combiner 22 and a reference reflector that has a reflective coating 38 on its bottom surface. In the double-pellicle stricture, the partially reflective splitting/combining region/surface 36 is enclosed/sandwiched between two substantially identical transmitting pellicles 22A and 22B. The use of reference reflector 24 with a reflective coating 38 on its bottom surface allows the reflector pellicle to be of any thickness, and even to have an opaque substrate (mirror). The use of such double-pellicle beam splitter/combiner 22 with the partially reflective coating sandwiched between two plates ensures optimal OPD matching across the entire spectral range. Given a minimal plate thickness that is constrained by spectral etaloning (and possibly also mechanical/manufacturing constraints) this type of beam-splitter is twice as thick compared to the other designs, which might result in increased aberrations of the spot on the sample (wafer).

Thus, generally, the double-pellicle configuration might be advantageous for broadband implementations including combined normal and oblique channel interferometry. The use of the single pellicle configuration might be advantageous for implementations with high detector spectral resolution and/or narrow source spectral bandwidth.

Figure 4A:
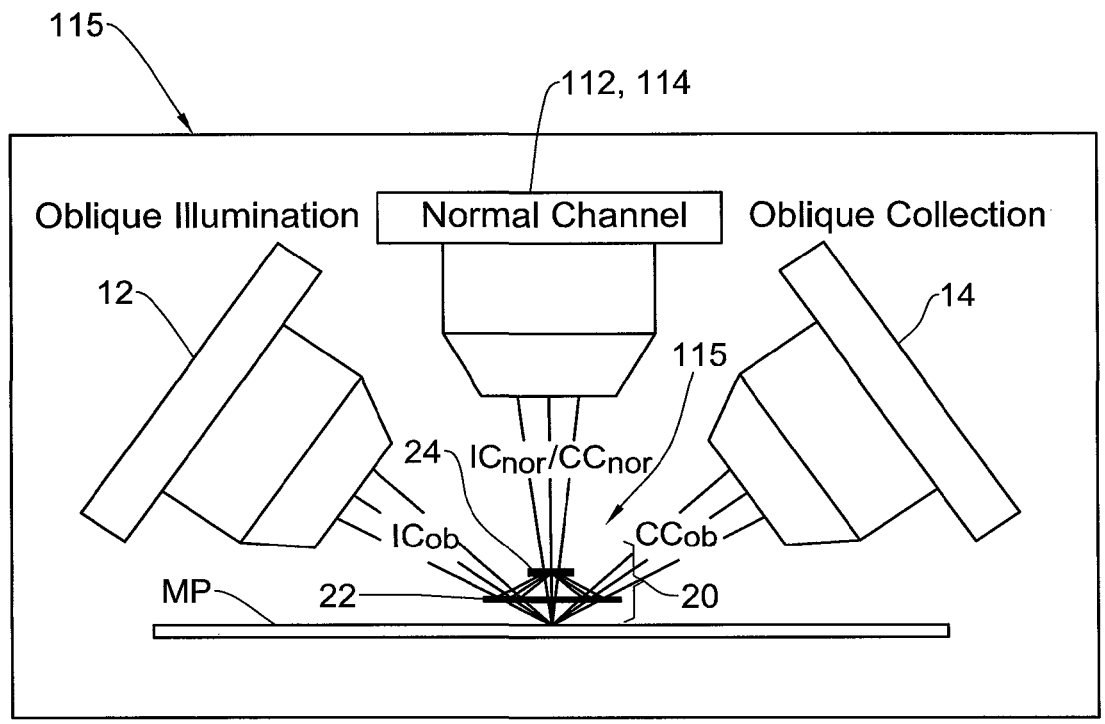
FIGS. 4A to 4C schematically exemplify the system configurations enabling concurrent/independent system operation in the oblique-channel spectral interferometric mode and normal-channel spectral interferometric mode.
Figure 4B:
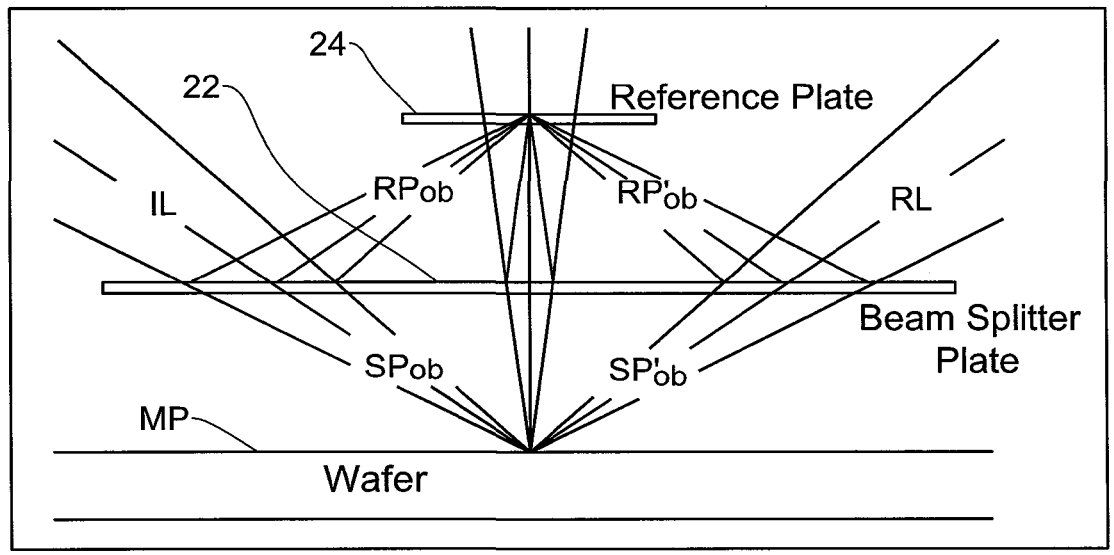
Figure 4C:
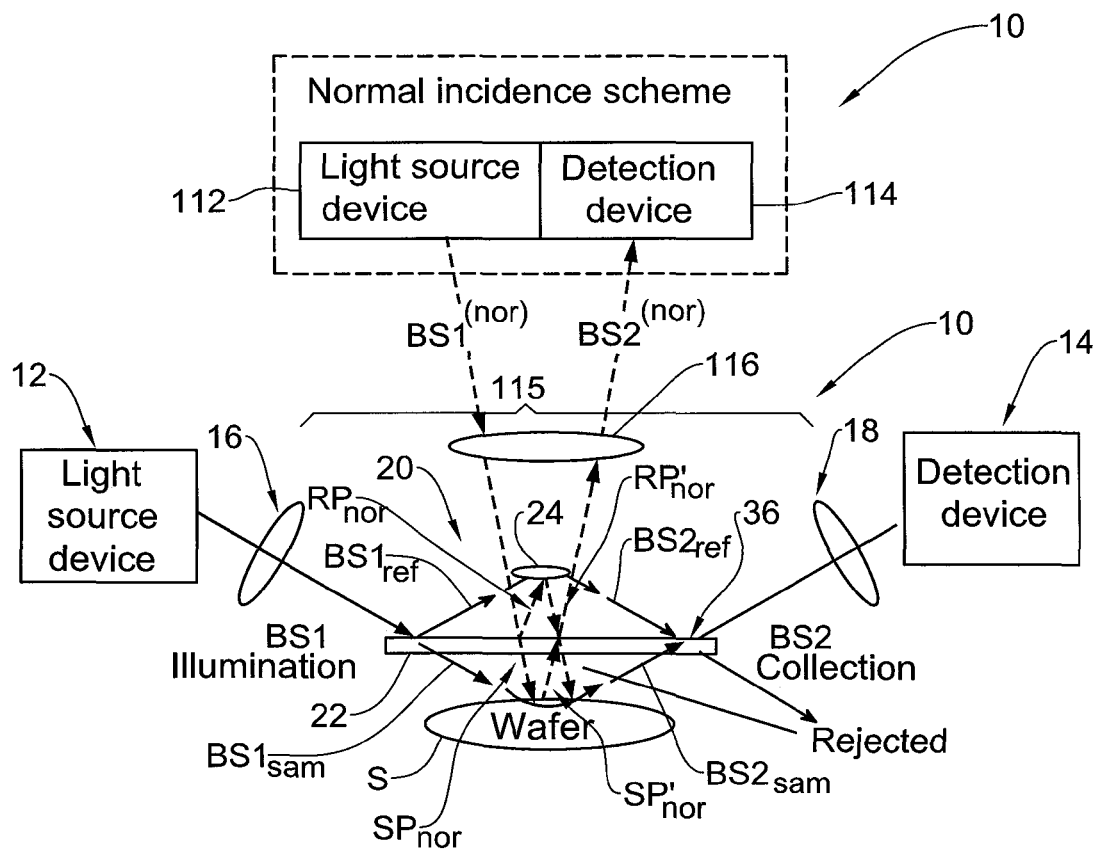

Reference is made to FIGS. 4A to 4C schematically exemplifying how the system of the invention can concurrently operate in the above-described oblique-channel spectral interferometric mode and normal-channel spectral interferometric mode. In this example, the same interferometric unit is used for both oblique and normal-channel modes. As shown in FIG. 4A, the system 10 includes the light source device 12 and detection device 14 associated with the oblique optical system defining oblique illumination and collection channels $IC_{ob}$ and $CC_{ob}$ (with their associated optics which is not specifically shown here) and a light source device 112 and 114 associated with normal illumination and collection channel $IC_{nor}/CC_{nor}$ (with the common optics including objectives and possibly other light directing elements, which are not shown here). As further shown in FIG. 4A, and more specifically illustrated in FIGS. 4B and 4C, the combined optical system 115 includes the interferometric unit 20 which is configured to be used for both oblique and normal modes interferometric measurements. The beam splitter/combiner 22 has a splitting/combining surface 36 installed in all the channels $IC_{ob}$, $CC_{ob}$, $IC_{nor}$/$CC_{nor}$; and the reference reflector device 24 has regions of different reflectivity.

Thus, the beam splitter/combiner 22 splits light from the oblique illumination channel $IC_{ob}$ into the oblique reference beam $RP_{ob}$ propagating to the highly reflective region of the reference reflector 24 and the oblique sample beam $SP_{ob}$ propagating to the measurement plane MP. The reference reflector 24 directs oblique reflected reference beam $RP'_{ob}$ back to the beam splitter/combiner 22 where this oblique reflected reference beam is combined with the oblique reflected sample beam $SP'_{ob}$ into the oblique collection channel $CC_{ob}$.

Concurrently or independently, the reference reflector plate 24 transmits light from the normal illumination channel $IC_{nor}$ being incident onto transmitting regions of the reference reflector device 24 to the beam splitter combiner 22 which splits this light into the normal reference beam $RP_{nor}$ propagating to the highly reflective region of the reference reflector 24 and the normal sample beam $SP_{nor}$ propagating to the measurement plane MP. The reference reflector 24 reflects this normal reference beam $RP'_{nor}$ back to the beam splitter/combiner 22 where this normal reflected reference beam is combined with the normal reflected sample beam $SP'_{nor}$ into the normal collection channel $CC_{nor}$.

Figure 5:
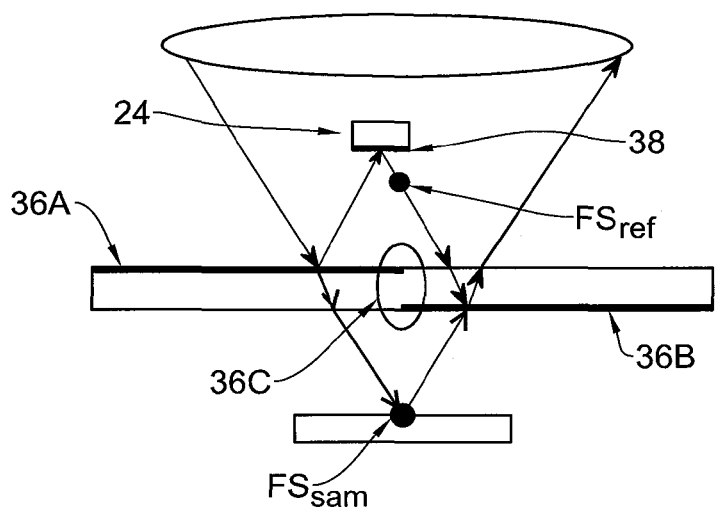
FIG. 5 exemplifies the use of a "step" pellicle example of FIG. 3D in the normal channel optical system.

As indicated above, the above-described "step" pellicle design can be used in the normal channel optical system design. This is exemplified in FIG. 5. The reference reflector structure 24 has a reflecting surface/coating (mirror) 38 facing downwards, and the beam splitter/combiner pellicle structure 22 has partially reflective surface/coating 36A facing upwards on half of its top side, and a partially reflective surface/coating facing downwards of a half of its bottom side. As shown in the self-explanatory manner, integrating the "step" pellicle design into the normal channel is possible, but the "step" region cuts the pupil in half. This may cause an obscured strip in the pupil due to the "step" region 36C. The reference mirror 24 causes a central obscuration as in a standard Mirau objective.

As an alternative to the use of pellicle design for the beam splitter-combiner as described above in FIGS. 3A-3E, aberrations induced by the beam splitter/combiner in the oblique channel system may be reduced by "encasing" the beam splitter/combiner within prism blocks, so that the block facets are orthogonal to the chief rays of light incident on/passing therethrough.

Figure 6A:
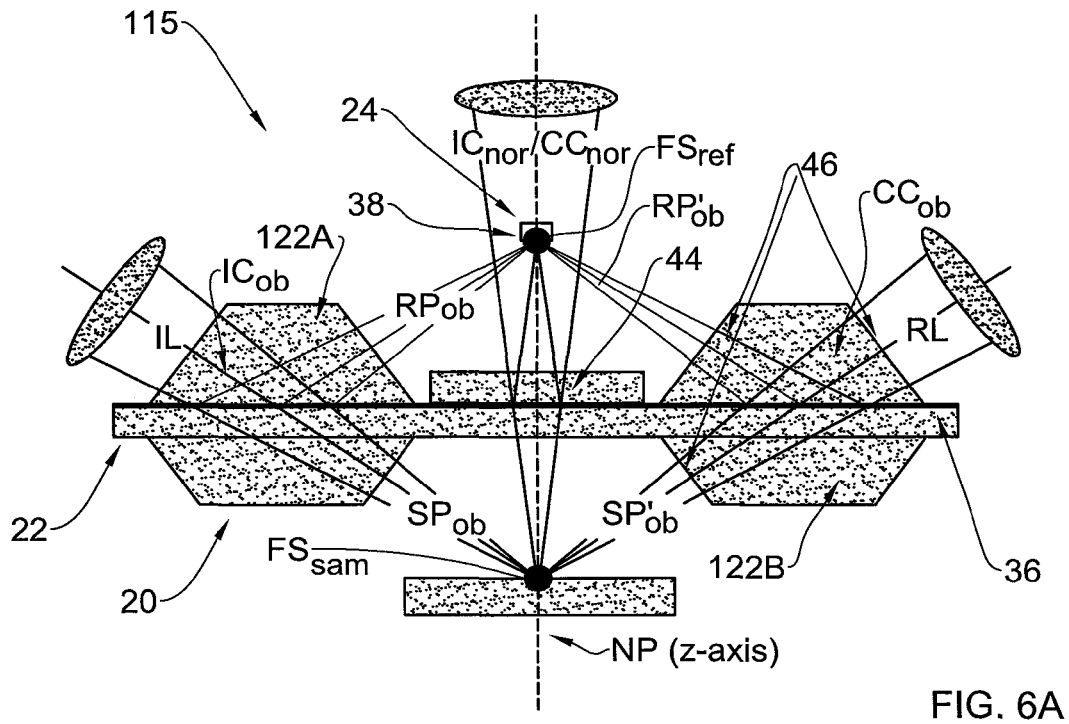
FIGS. 6A and 6B exemplify the oblique channel beam splitter/combiner encased within prism blocks (block facets are orthogonal to the chief rays of light passing therethrough) for reducing aberrations induced by the beam splitter/combiner.
Figure 6B:
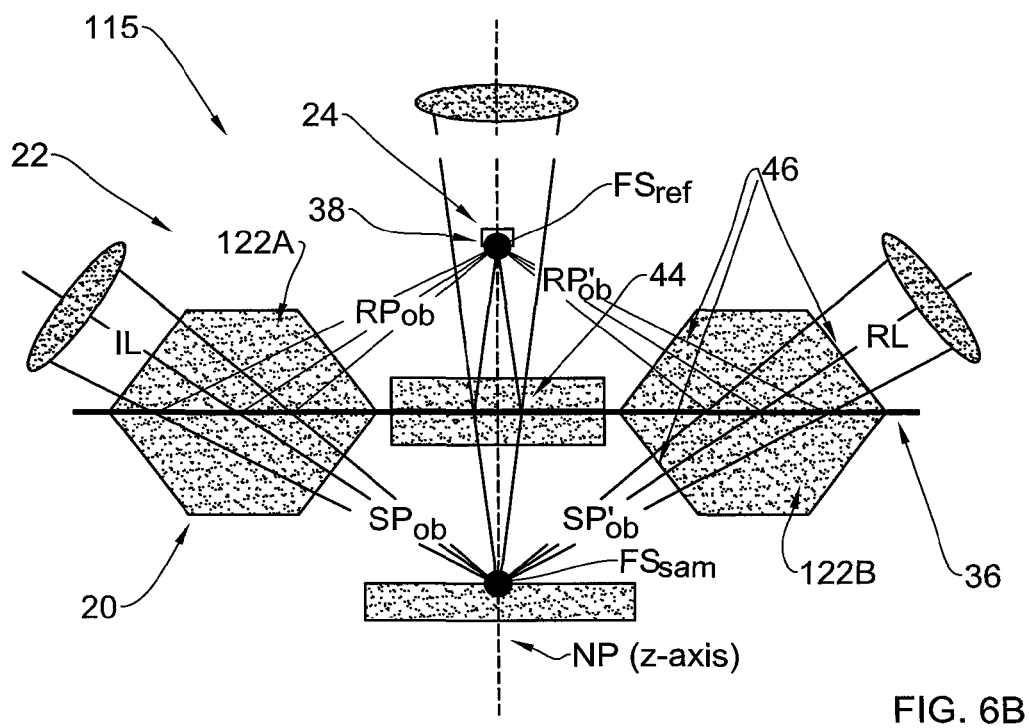

Such configurations of optical system 115 are exemplified in FIGS. 6A and 6B. In these specific not limiting examples, the combined optical system using the oblique and normal channels is illustrated.

As shown in FIG. 6A, the optical system 115 includes oblique illumination and collection channels $IC_{ob}$, $CC_{ob}$, and normal illumination and collection channel $IC_{nor}$/$CC_{nor}$; and beam splitter/combiner device 22 having a splitting/combining surface 36; a reference reflector device 24 having a reflecting surface 38. Here, prisms 122A and 122B are attached to the beam splitter/combiner plate 22. The prisms are configured such that the prism facets 46 are orthogonal to the chief rays of light passing therethrough. In this example, the splitting/combining coating 36 is on the top side of the plate 22, but it should be understood that with suitable modification it can alternatively be on the bottom side. The reference reflector 24 may be deposited on a clear plate, or it can be free-standing.

The normal channel system preferably also includes a compensator block 44 that matches the thickness of the beam-splitter plate 22. This ensures the OPD symmetry between the reference and sample arms with respect to the normal plane NP.

FIG. 6B illustrates a similar design of the optical system 115, but using separated prisms 122A and 122B, i.e. not glued to the same plate.

Figure 7:
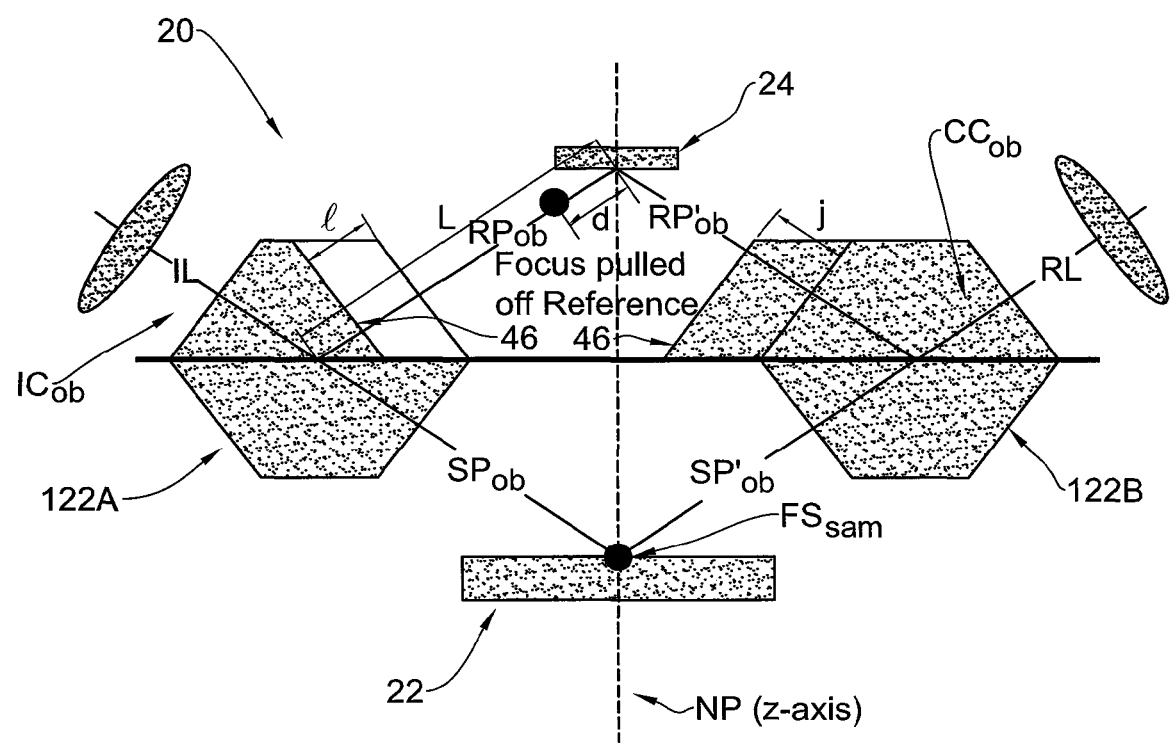
FIG. 7 exemplifies the oblique channel interferometric unit utilizing a beam splitter/combiner device formed by asymmetrical prisms.

In the above-described examples, symmetric prisms are used. Reference is made to FIG. 7 exemplifying the interferometric unit 20 utilizing a beam splitter/combiner device 22 formed by asymmetrical prisms 122A and 122B. The prism facets 46 of the reference arm $RP_{ob}$ and $RP'_{ob}$ are offset by the same distance/amount l but in opposite directions with respect to the normal plane NP. This ensures that OPD between arms remains symmetrical, but it causes the reference arm to focus off of the reference reflector device 24 by a certain distance d.

This configuration allows for fine-tuning the lateral displacement between the recombined beams (i e. reflected reference and sample beams' paths $RP'_{ob}$ and $SP'_{ob}$) at the output of the interferometric unit 20. It is important for these beams to be properly aligned in order to maintain sufficient coherence so that interference fringes (pattern) may be observed. Angular misalignment of the prisms and/or their facets and/or beam splitting/combining surfaces may cause the recombined beam to be laterally displaced. As with all oblique configurations, vertical displacement of the beam splitting/combining surface(s) and/or measurement plane and/or reference reflecting surface, causes a vertical shift between the recombined beams. This can be used to fine-tune beam alignment in this direction. However, beam alignment in the lateral direction (in/out of page, orthogonally to the plane of incidence) is more difficult in the symmetrical configurations of the prisms. This is the advantage of the asymmetrical configuration. By tilting/tipping the reference mirror, the lateral alignment may be fine-tuned. This can be implemented since the reference reflector is at some distance d from the reference beam's point of focus. The ratio between distance d and the arm length l determines the sensitivity of this type of correction. This configuration can also be integrated with the normal channel, and may be implemented as separate prisms (as shown in FIG. 7) or as monolithic assembly (similar to that of FIG. 6A).

As described above with reference to FIG. 2, the oblique channel optical system 15 can be configured to be selectively shiftable/switchable between the spectral interferometric and spectral reflectometric modes. To this end, a light propagation affecting device 32 can be used. This is exemplified in FIGS. 8A and 8B.

Such light propagation affecting device 32 may include one or more shutter(s). Such device may be required to incapacitate the reference arm and allow the system to operate in a non-interferometric mode. This might for example be needed for calibrations and accurate sample reflection intensity measurements. The shutter may operate by blocking the optical path in the reference arm, or by diverting the light in the reference arm so that it doesn't reach the detector. The latter may be effected by using available degrees of freedom, such as reference reflector z and/or tip/tilt. This will be described more specifically further below.

Figure 8A:
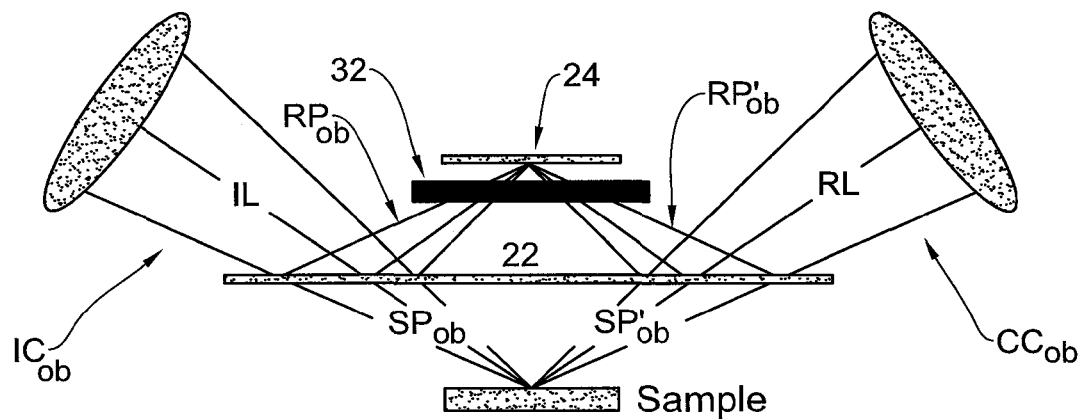
FIGS. 8A and 8B exemplify the use of light propagation affecting device(s) in the oblique channel optical system to enable selective shift/switch of the system operation between the spectral interferometric and spectral reflectometric modes.

FIG. 8A shows how a retractable blade 32 may be used to block light in the reference arm. This configuration exemplifies blocking of both reference and reference reflected paths. It should, however, be understood that, alternatively, either one of these paths can be blocked thus making the reference arm inoperative. Also, in this example, the configuration of the retractable blade 32 is such that, when the shutter blocks the reference path(s), the system operates in oblique reflectometric mode. This configuration, however, does not allow normal measurements to take place when the shutter blocks the path. This may be overcome by using separate shutter(s) for either one of the normal and oblique channels (not shown here).

Figure 8B:
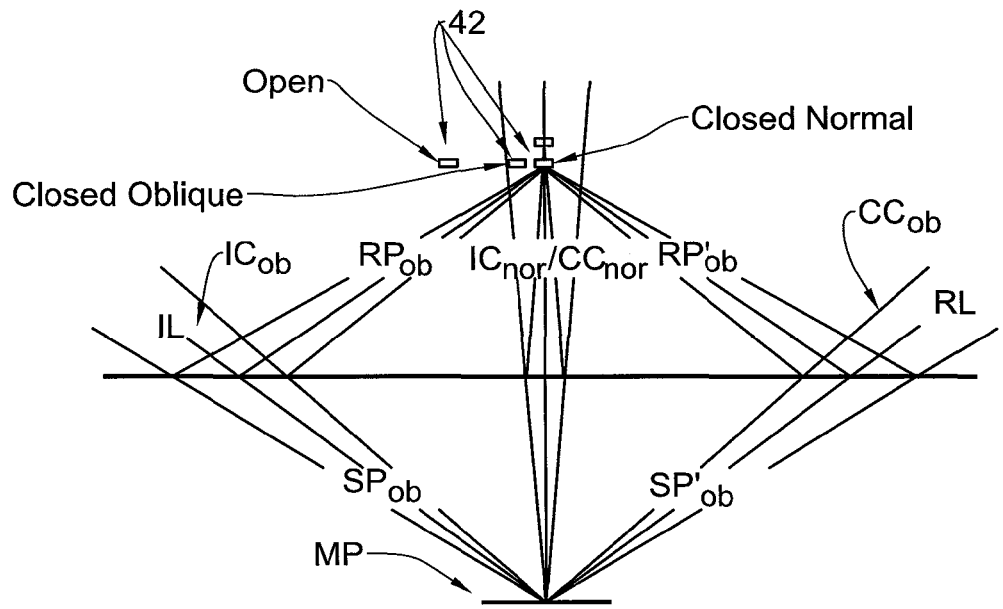

FIG. 8B exemplifies a configuration where a single blade/shutter 42 is shiftable between three positions, allowing the system operation with combined normal and oblique channels. The blade 42 positions are as follows: Open position allowing concurrent interferometric measurements in both normal and oblique channels; Closed Normal position in which it blocks the reference path for normal channel thus allowing concurrent oblique-mode interferometric and normal-mode reflectometric measurements; and Closed Oblique position in which it blocks the reference path for oblique channel thus allowing concurrent oblique-mode reflectometric and normal-mode interferometric measurements. The shutter 42 is small enough to "hide" in the reflector's central obscuration of the normal channel so that it minimizes the shutter's effect on the non-interferometric normal channel measurements Reference is made to FIGS. 9A-9F showing some other examples of the configurations of the optical system enabling shifting the system operation between different modes. In these examples, the light propagation affecting device 32 utilizes foldable reflectors/mirrors 48A and 48B associated with the reference and reflected reference paths $RP_{ob}$ and $RP'_{ob}$. Generally, only one of these foldable reflectors can be used in either one of the reference and reflected reference paths $RP_{ob}$ and $RP'_{ob}$. In the examples of FIGS. 9A-9E, the optical system (light propagation scheme) is symmetrical with respect to the normal plane NP, and FIG. 9F illustrates an offset position of the reference reflector device 24. In all the examples, the beam splitter/combiner device 22 may be formed by pellicle(s), or cubes or prisms (in either separated or monolithic configuration).

Figure 9A:
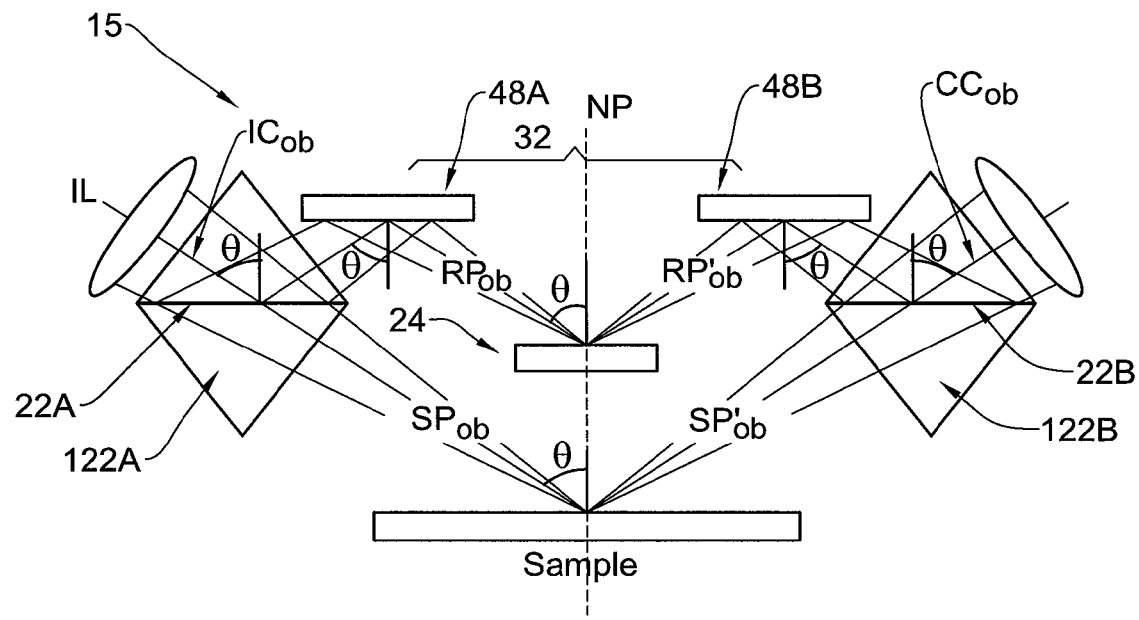
FIGS. 9A-9F show some other examples of the configurations of the optical system shiftable between different operational modes, utilizing foldable reflectors/mirrors as light propagation affecting devices, where

FIG. 9A illustrates the oblique channel optical system 15 including a beam splitter/combiner device 22 formed by beam splitting/combining surfaces 22A and 22B in the separated prisms 122A and 122B located in the illumination and collection channels $IC_{ob}$ and $CC_{ob}$; a reference reflector device 24 and folding mirrors 48A and 48B associated with the reference arm. The folding mirror 48A is shiftable/displaceable between its operative and inoperative positions being, respectively, in and out of the reference path $RP_{ob}$; and folding mirror 48B is shiftable between its operative and inoperative positions being, respectively, in and out of the reflected reference path $RP'_{ob}$. Generally, only mirror 48A or mirror 48B may be displaceable.

Thus, when mirrors 48A and 48B are operative, the optical system 15 operates in the oblique spectral interferometric mode. More specifically, mirror 48A receives and reflects the reference beam $RP_{ob}$ to the reference reflector 24, which reflects it back to mirror 48B, and from there the reference reflected beam $RP'_{ob}$ is directed to the prism 122B where it is combined with the reflected sample beam $SP'_{ob}$, thereby producing an interference pattern on the detection plane. When mirrors 48A and 48B (or at least mirror 48A) are inoperative, the reference arm is inoperative and the system 15 operates in the reflectometric mode using only the sample arm.

In the example of FIG. 9A, the beam splitting/combining surfaces 22A and 22B in the prisms 122A and 122B, and the reflecting surfaces of mirrors 48A and 48B are parallel to the measurement plane MP, i.e. illuminating light L1, reference beam $RP_{ob}$ and reflected reference beam $RP'_{ob}$ have the same angle of incidence θ on, respectively, the beam splitting surface 22A, the folding mirror 48A and the reference reflector 24. The bean splitter/combiner and mirror folding angles match the oblique angle. The path lengths for reference and sample arms are matched. Three reflections in the reference path vs one reflection in the sample path ensures that pupil orientations are preserved when recombined at the collection channel. The prisms are preferably configured with facets oriented orthogonal to the beam chief rays to minimize aberrations.

Figure 9B:
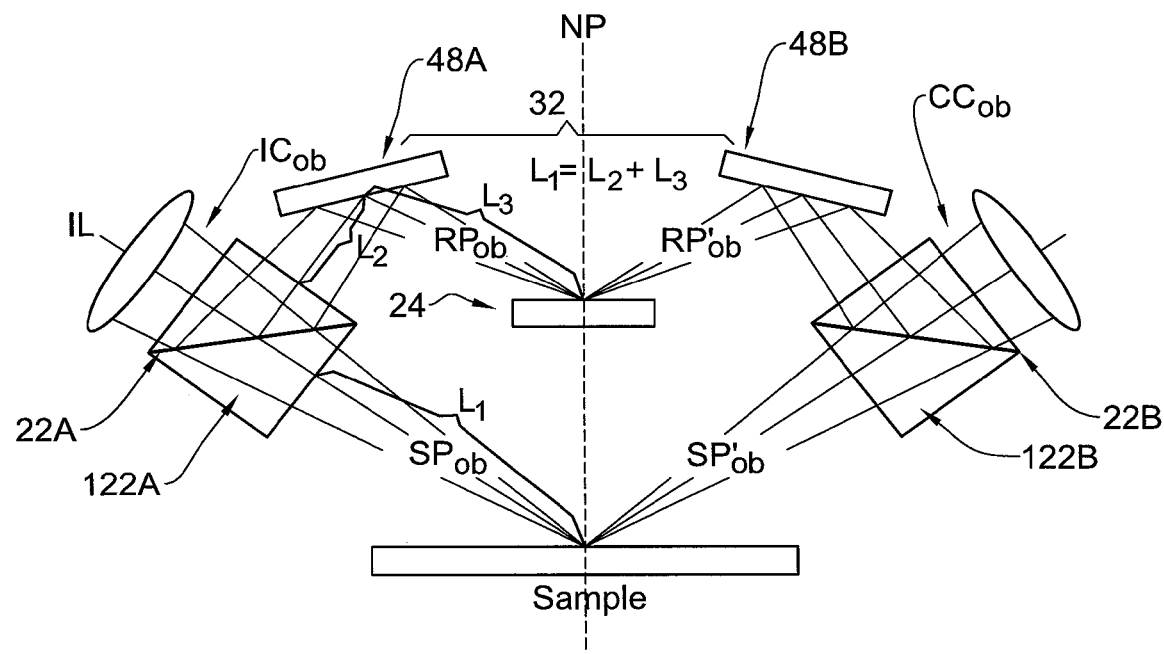

FIG. 9B exemplifies the configuration where the beam splitting/combining surfaces 22A and 22B and reflecting surfaces of mirrors 48A and 48B are not parallel to the measurement plane MP and reference reflector 24 plane. As shown the position and angular orientation of these surfaces are selected to satisfy the matching condition of the reference and sample arms (including also the match of environmental conditions, i.e. media along the reference and sample arms). As the reference and sample portions pass the same optical path inside the prism 122A, an optical path L1 of the sample beam $SP_{ob}$ between the outer facet of prism 122A and the measurement plane MP is equal to the sum of the reference beam optical paths L2 and L3 from, respectively an outer facet of the prism 122A and the folding mirror 48A and the folding mirror and the reference reflector. The same condition is satisfied for the reflected reference and reflected sample paths in this symmetric configuration of the optical system.

Thus, here the beam splitting and combining surfaces do not match oblique angle θ, e.g. cubes are right-angle. This requires rearrangement of the folding and reference mirrors to ensure that the optical path lengths of the sample and reference arms match, i.e. folding angles are not necessarily equal to the oblique angles.

Figure 9C:
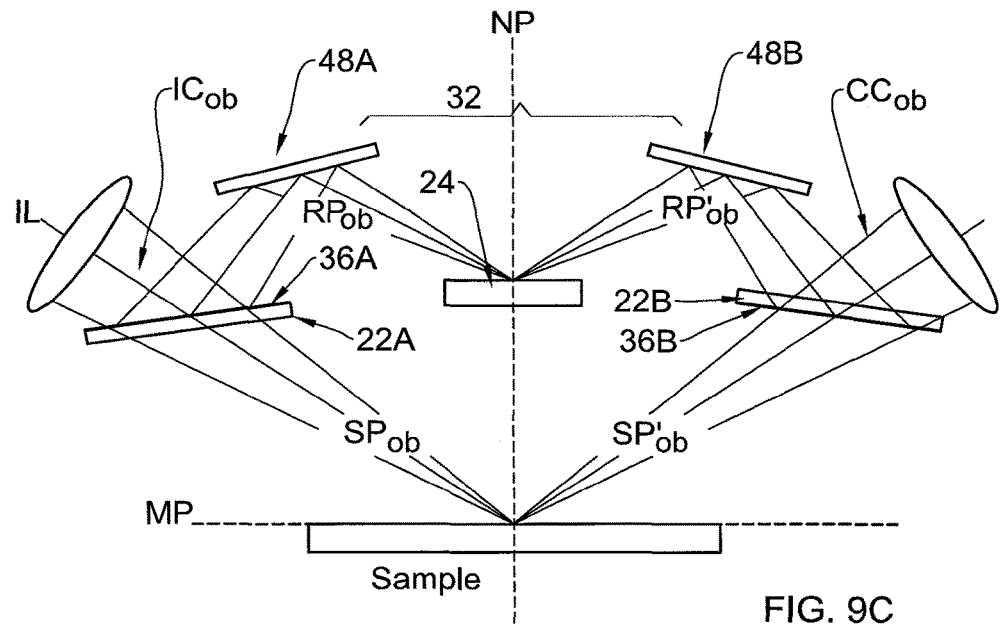

FIG. 9C illustrates a non-parallel configuration similar to that of FIG. 9B, but using the beam splitter/combiner device 22 formed by pellicles 22A and 22B. Here, the splitting surface 36A is formed on the top side of the pellicle 22A, and the combining surface 36B is formed on the bottom side of the pellicle 22B. This is in order to compensate the OPD associated with the portions of the reference and sample paths and the reflected reference and sample paths inside the pellicles 22A and 22B.

In this example the OPD compensation can be achieved by flipping one of the beam splitter plates (plate 22B in this example). Each path (sample/reference) passes through the plate bulk exactly once. Same angles of incidence ensure that aberrations are matched between the paths. Some adjustment of folding geometry is required.

Figure 9D:
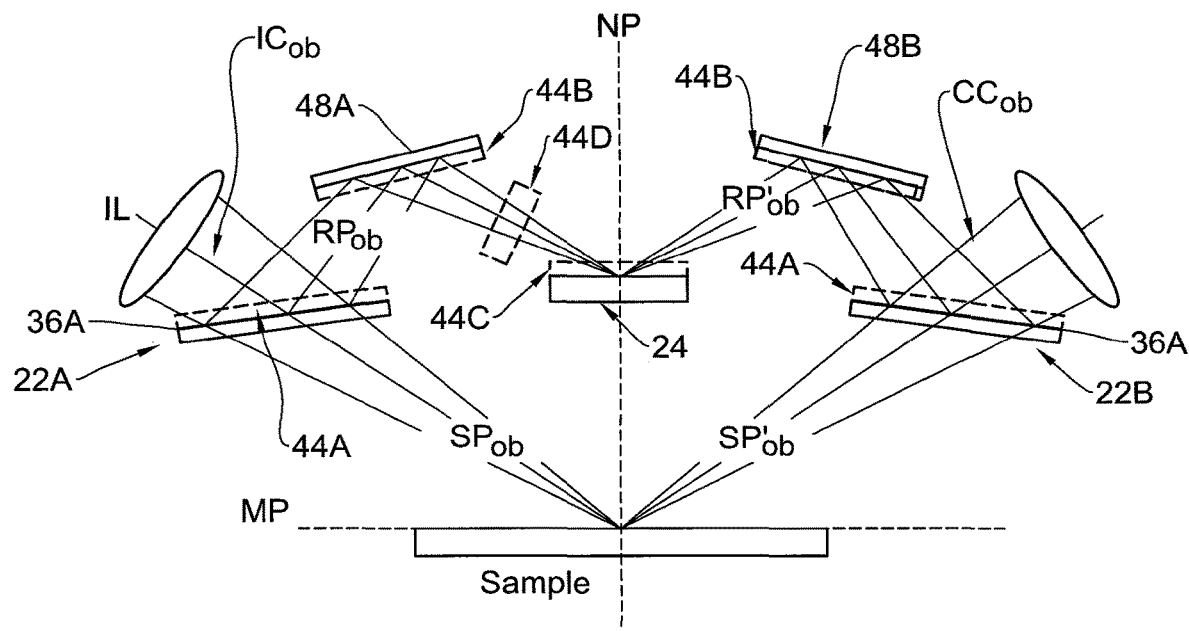

FIG. 9D illustrates a non-parallel configuration similar to that of FIG. 9C utilizing pellicle structures 22A and 22B, but a different solution for the OPD compensation. Here, the pellicles 22A and 22B are configured as symmetrically identical plates with the beam splitting and combining surface 36A and 36B on their top sides. Accordingly, the optical system 15 further includes separate OPD compensators. As shown, possible options for such compensators include: (1) placing OPD compensators 44A at the pellicles 22A and 22B; or placing OPD compensators 44B at the folding reflectors 48A and 48B; or placing OPD compensator 44C at the reference reflector 24; or placing OPD compensator 44D as a separate plate in the portion of the reference path between the folding mirror 48A and reference reflector 24.

Thus, in this example, beam splitters/combiners are used with partially reflective coating preferably on top side. Angles do not have to necessarily match oblique angles, smaller angles of incidence on the beam splitter plates reduce aberrations. Compensator plate(s) is/are needed somewhere in the reference path in one of the following: (i) top surface of beam splitters (this option is preferable as it introduces same aberrations to the sample and reference paths); (ii) folding mirror surface (at approximately half thickness); (iii) reference mirror; (iv) free space plate(s).

Figure 9E:
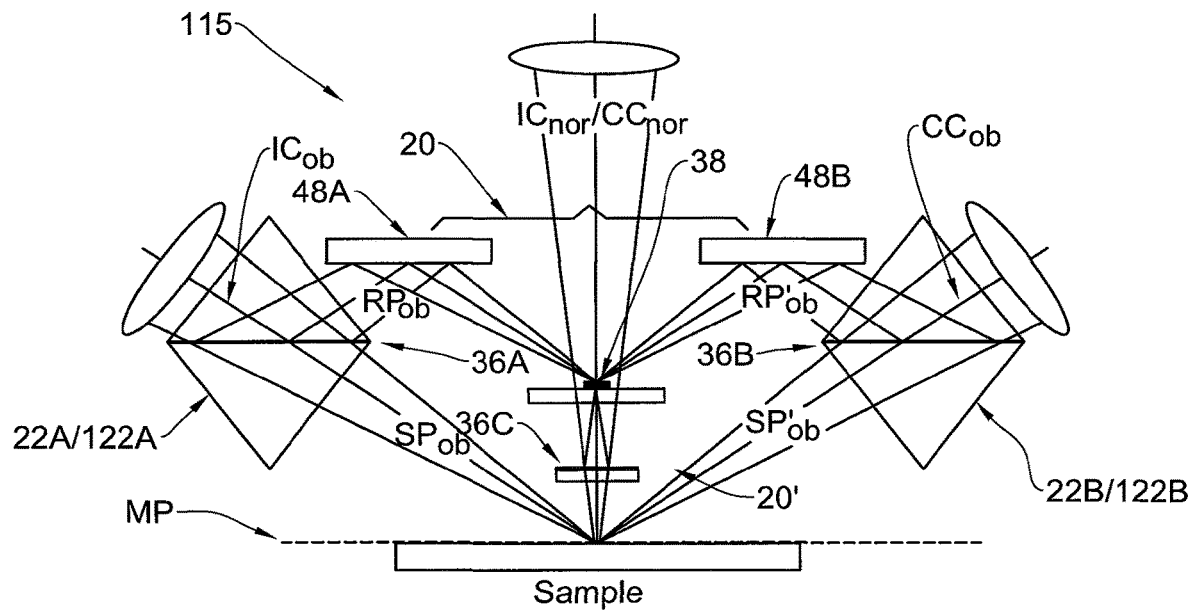
Figure 9F:
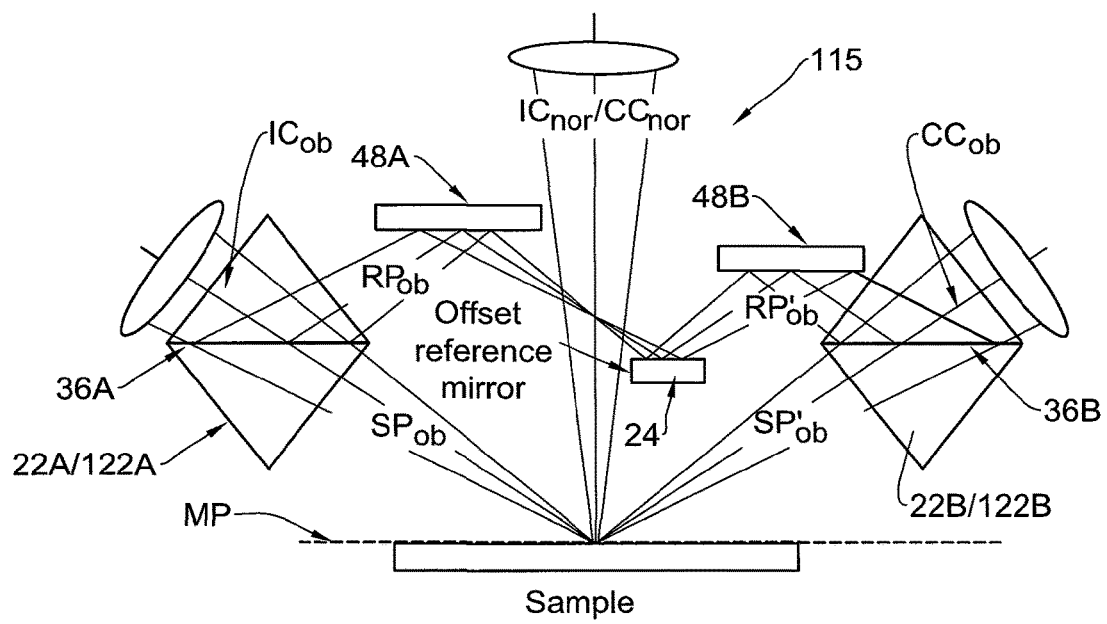

FIG. 9E exemplifies the configuration of the optical system 115, which is generally similar to those of FIGS. 6A and 6B in that it includes both oblique and normal channels' systems, but further modified to enable the system operation in either combined oblique and normal spectral interferometric mode or combined oblique reflectometric and normal interferometric mode. To this end, system 115 of this example includes folding mirrors 48A and 48B. More specifically, system 115 includes a beam splitter/combiner device 22 including oblique-channel splitting and combining surfaces 36A and 36B associated with prisms 122A and 122B, and optionally includes also a normal-channel splitting/combining surface 36C; a common reference reflector 24; and folding mirrors 48A and 48B accommodated as described above in respectively oblique reference beam path $RP_{ob}$ and oblique reflected reference path $RP'_{ob}$. The reference reflector 24 together with normal-channel splitting/combining surface 36C forms an optional normal-channel interferometer 20'. The reference reflector 24 includes a highly reflective coating pad 38 deposited on a transparent plate. The pad size is small enough so that obscuration of the normal channel is minimized. For the normal channel, reflection from bottom surface of the pad is used; the mirror plate acts as compensator for normal channel beam splitter/combiner 36C.

Thus, when the folding mirrors 48A and 48B (or at last mirror 48A) are operative the system can operate concurrently or independently in the oblique and normal spectral interferometric modes. When the folding mirrors are inoperative, the system can operate concurrently or independently in the oblique spectral reflectometric and normal spectral interferometric modes.

In this non-limiting example of FIG. 9E, the oblique channel system utilizes parallel configuration of FIG. 9A. It should, however, be understood that non-parallel configuration of either one of FIGS. 9B to 9D can be used as well.

FIG. 9F illustrates yet another example of the optical system 115 operable in oblique spectral interferometric, oblique spectral reflectometric, and normal spectral reflectometric modes. Here, the folding geometry, defined by the positions and angular orientations of the beam splitting and combining surfaces 36A, 36B and the folding mirrors 48A and 48B, is arranged so that the reference mirror 24 is offset from the normal channel path. This configuration has advantage in that the reference mirror is not in the image plane and thus less sensitive to contamination. Indeed, contamination (dirt, particles) on optical components (mirrors, lenses etc.), that are near image, plane cause optical aberrations/obscurations that are highly localized and with relatively high modulation. On the other hand, for contamination on optical components that are far from the image plane, the effect is spread out, and usually weak to a negligible level (since the contamination is highly defocused relative to the image plane). Also, in this configuration, the normal channel is totally independent, and can also incorporate the interferometer, similar to that of the example of FIG. 9E.

In order to obtain interference fringes with adequate contrast sufficient lateral (transverse) and temporal (longitudinal) coherence should be maintained in the interferometer. Longitudinal coherence is governed by the optical path difference (OPD) between reference and sample arms relative to the spectral bandwidth. Given a spectral bandwidth (or spectral resolution) of the source/detector of $\Delta\lambda$, the typical coherence length $L_c$ is:

$$L_c = \lambda^2/\Delta\lambda$$

The OPD has to be smaller than the coherence length $L_c$ in order to obtain fringes.

Spatial coherence is given by the normalized overlap integral between the spot from the reference arm and the spot from the sample arms:

$$\gamma = \frac{\langle E_s | R_R \rangle}{\sqrt{\langle E_R | E_R \rangle \langle E_s | E_S \rangle}}$$

wherein the inner product is defined as $\langle\!\langle E|F\rangle\!\rangle = \iint E'F d^2x$.

To leading order, the overlap integral is affected by the following geometric optics parameters: lateral displacement (boresight) between spots $\Delta x$, tilt between the spots' chief rays $\Delta\alpha$, and relative defocus between the spots $\Delta f$. Also, any other differences between the spots such as higher-order wavefront error (WFE), and polarization rotation/depolarization degrade the spatial coherence. In terms of WFE and Zernike polynomials, lateral displacement ($\Delta x$) is determined as tilted WFE (Z2, Z3), relative defocus ($\Delta f$) is equal to power WFE (Z4), and the tilt is determined as the lateral displacement between pupils. Any other aberrations, such as astigmatism, coma, spherical, trefoil, etc. are referred to as "higher-order" WFE. To leading order, WFE difference between channels affects the overlap parameter as:

$$\gamma = 1 - 2\pi^2\sigma^2$$

where $\sigma$ is the WFE difference standard deviation measured in waves. More specifically, assuming that the WFE difference between the pupils is given by the function $\varphi(x,y)$, where $\varphi$ is measured in radians, and x,y denote coordinates of the pupil, the WFE difference measured in waves is determined as $\varphi(x,y)/2\pi$, i.e. 1 wave=$2\pi$ radians, and $\sigma$ is the standard deviation of $\pi(x,y)/2\pi$ taken over the entire pupil.

As indicated above, obtaining high contrast interference fringes depends on optimal alignment of the recombined beams. The beam alignment depends on the alignment and geometry of all components in the interferometer.

Figure 10A:
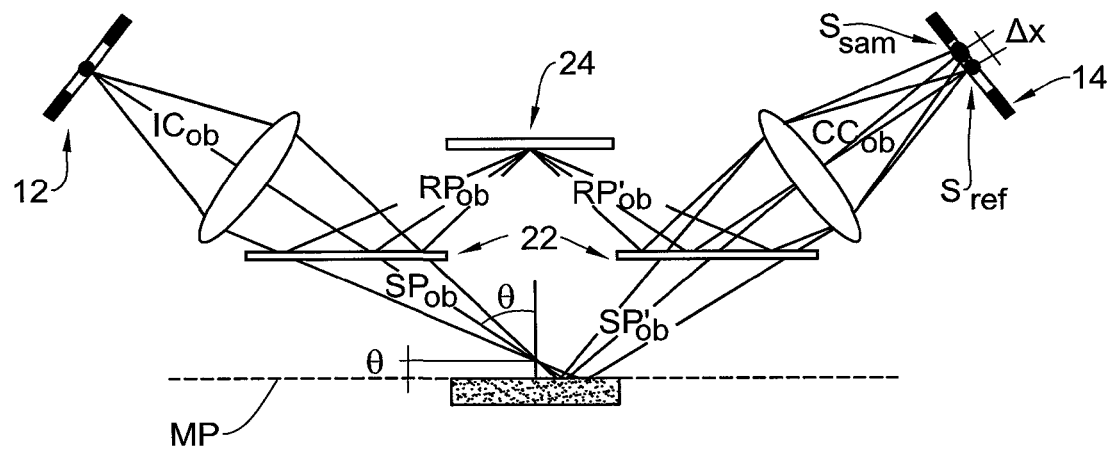
FIGS. 10A and 10B exemplify how errors in the vertical position of the measurement plane cause the beam misalignment (FIG. 10A) and how a tilt between the beam-splitter surfaces (split vs. combine) causes beam misalignment (FIG. 10B)

One of the simplest examples is how errors in the vertical position of the measurement plane (along the normal to the measurement plane) cause the beam misalignment. This is illustrated in FIG. 10A. As shown, the error in the vertical position of the measurement plane (i.e. the measurement plane is displaced from a focal plane) results in that the reflected reference beam $RP'_{ob}$ and reflected sample beam $RS'_{ob}$ are not combined at the beam combining surface 22 and thus are focused by collection channel lens unit onto spaced-apart spots $S_{ref}$ and $S_{sam}$ in the detection plane. In another example, schematically illustrated in FIG. 10B, a tilt between the beam-splitter surfaces (split vs. combine) causes beam misalignment. This can be due to mounting errors of separate beam-splitters (as shown), or curvature of a single beam-splitter plate.

Thus, the system parameters are to be properly selected to yield the required tolerances on mounting, alignment and geometry for all the components of the system in order to maintain adequate spatial and temporal coherence between the arms. However, in some cases, it is possible to relax some of these tolerances by adding degrees of freedom to the components to compensate for tolerances on components and their alignment and mounting.

Figure 11A:
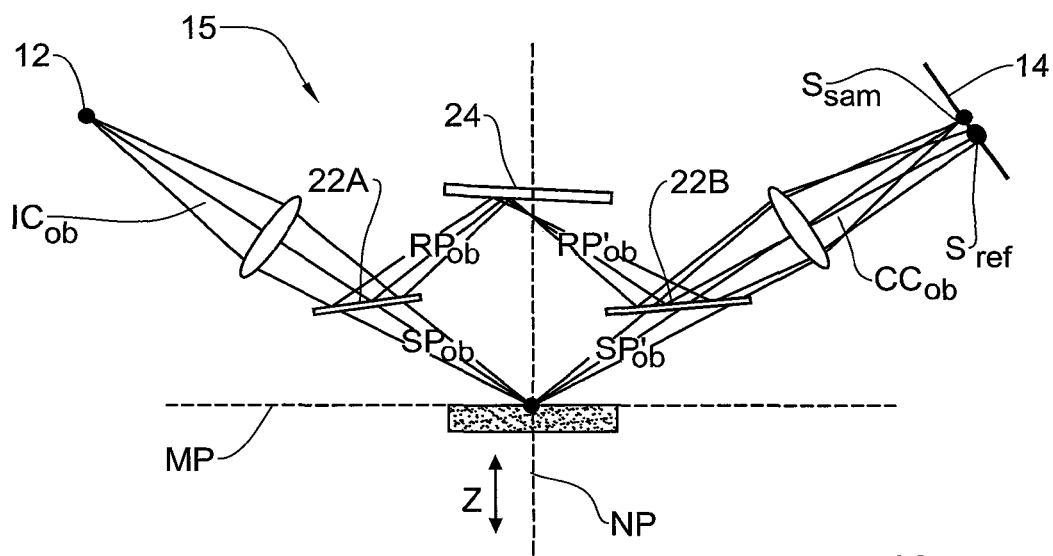
FIGS. 11A and 11B illustrate schematically light propagation scheme in the oblique interferometric system, where various components (beam splitting/combining elements and the reference reflector) are tilted.
Figure 11B:
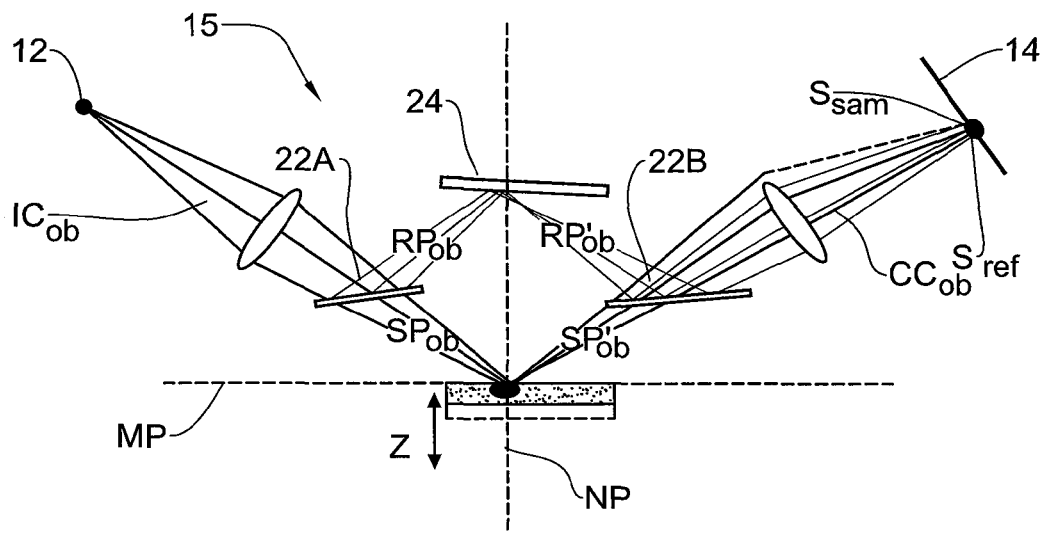

In this connection, reference is made to FIGS. 11A and 11B illustrating schematically light propagation scheme in the oblique optical system 15, where various components such as beam splitting/combining elements 22A and 22B, and the reference reflector 24, are tilted (i.e. assuming that Mirau components are misaligned). As shown in FIG. 11A, although the illuminating spot on the sample is in-focus (assuming that bare system was properly calibrated so that spot remains focused on sample in the measurement plane), the reference and sample spots $S_{ref}$ and $S_{sam}$ imaged on the detector plane are laterally displaced in the plane of incidence. For a large displacement, virtually no interference fringes are observed. FIG. 11B shows that with the above tilted components of FIG. 11A, by adjusting the z position of the measurement plane (along an axis normal to the measurement plane), the lateral displacement between the spots on the detector may be minimized.

However, depending on the exact configuration, there may still remain residual errors that cause de-coherence and/or degraded optical performance, such as, but not limited to different focus between spots, different chief ray tilt, different pupil filling, defocus on wafer, OPD between arms, WFE difference between arms due to passage through different parts of the common optical path. In general, this is the type of compromise that needs to be performed when adding degrees of freedom to compensate for a non-perfect system. The following are some examples for the degrees of freedom configurations.

A sample supporting stage (that carries a sample being measured) aligns the measurement plane (sample) with respect to the optical system. There is lateral alignment (x,y), as well as focus (z). In the oblique channel, the lateral alignment is coupled to the focus degree of freedom. Once the sample arm is correctly aligned with the measurement plane, the reference arm should match in order to preserve spatial and temporal coherence between the arms. The oblique path geometry couples vertical motion with lateral displacement. Therefore, in this channel, vertical displacement of the measurement plane causes a change in the lateral alignment between the reference and sample arms (boresight). It also changes the OPD between the paths.

Figure 12A:
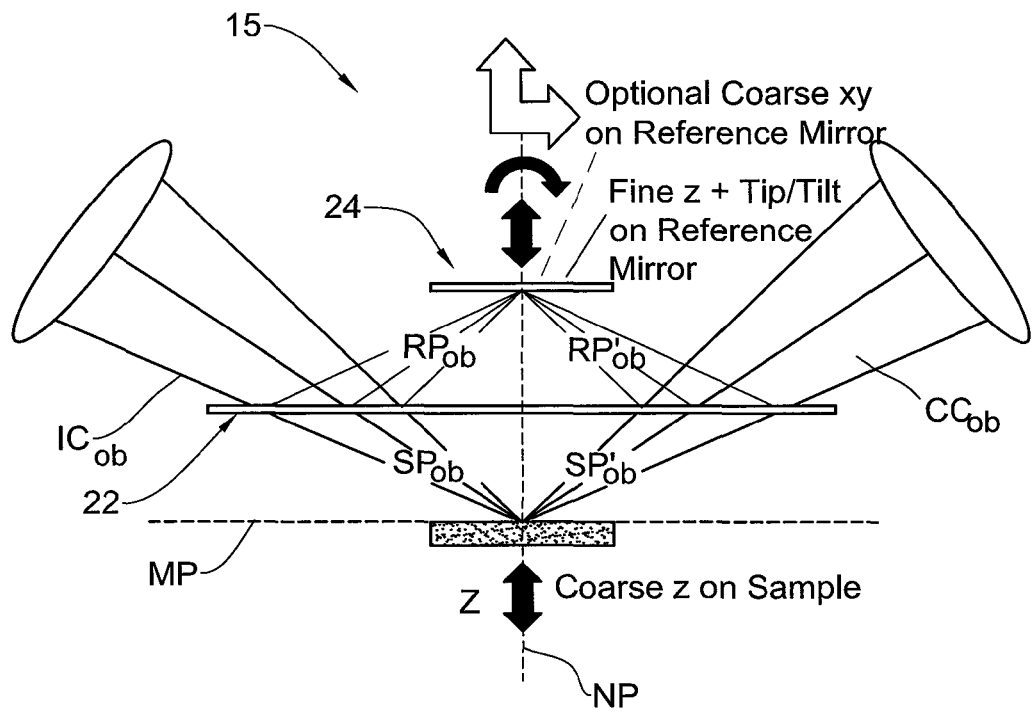
FIGS. 12A to 12D show various example for the degrees of freedom configuration, where

FIG. 12A exemplifies the configuration which incorporates a stage with (z+tip/tilt) for the reference reflector device 24. As shown, the beam splitting/combining plane 22 is in the fixed vertical (z) position, while the reference reflecting plane 24 is controllably driven (by appropriate driving mechanism as described with reference to FIG. 2 above) for fine tip/tilt movement with respect to the normal plane NP and fine z-axis movement. For example, tilt may be adjusted by several milliradians to align reference mirror plane with a sample site in the measurement plane. Z-axis may be adjusted by several tens of microns to match OPD between the reference mirror 24 and the sample. It all depends on the accuracy of sampling handling and placement. Also, the sample's stage (measurement plane) is mounted for course movement along the z-axis. Optionally, the reference mirror 24 may be mounted for coarse displacement in the x-y plane (parallel to the measurement plane). These degrees of freedom allow fine tuning of spatial coherence.

These additional degrees of freedom can also be used to compensate for optical tolerances in the interferometer components. In a combined normal/oblique configuration, normal and oblique paths might require different compensation positions. These degrees of freedom also allow partial compensation of plate wedge and plate mounting tip/tilt tolerances. Lateral translation degrees of freedom for the reference reflector might also be desirable as these will facilitate centration of the reference reflector pad (as described above) and/or moving any contamination/defects on the reflecting surface out of the field of view.

Figure 12B:
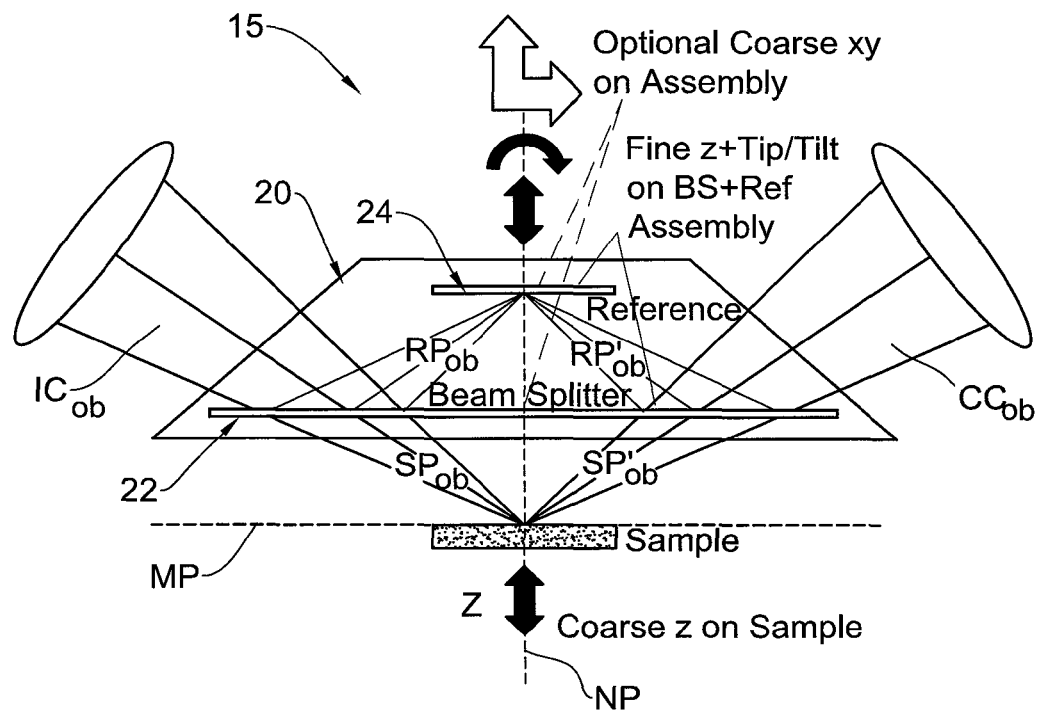

In this connection, reference is made to FIG. 12B shows an alternative configuration for mounting the entire interferometer assembly 20 (i.e. the beam splitting/combining surface(s) 22 and the reference reflecting surface 24) on a stage that is controllable displaceable along the z-axis and tiltable/pivotal with respect to the normal plane, i.e. a (z+tip/tilt) stage. This configuration gives the same functionality as that of FIG. 12A. Similarly to the above example, the sample's stage (measurement plane) is mounted for course movement along the z-axis; and optionally, the reference mirror 24 is mounted for coarse displacement in the x-y plane (measurement plane).

It should be noted that similar compensation can be obtained if the beam-splitter plate 22 is given (z+tip/tilt) degrees of freedom, whilst the reference mirror 24 is held static (fixed position), which is not specifically shown.

As described above, the asymmetrical configurations (such as "step" pellicle of FIG. 5, and asymmetrical prisms of FIG. 7), cause the lateral translation of spots to couple to the reference mirror tip/tilt (or monolith or beamsplitter plate only tip/tilt). This is useful for correcting for lateral displacement between the spots perpendicular to the plane of incidence (i.e. in the normal plane as defined above). It should be noted that this type of correction is not available to the symmetrical configurations of FIGS. 12A and 12B.

Figure 12C:
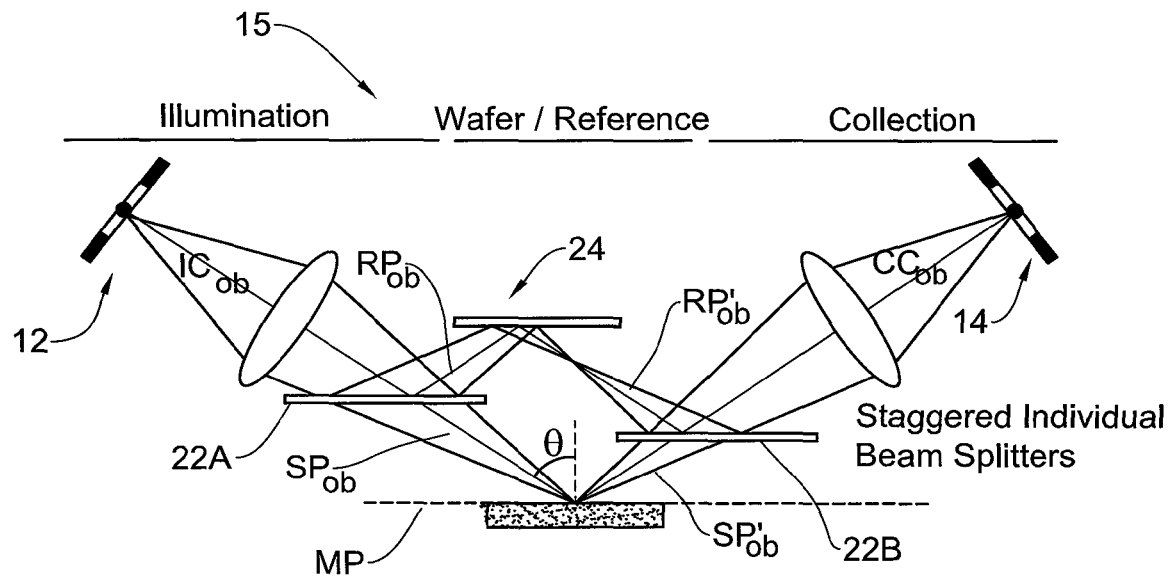
Figure 12D:
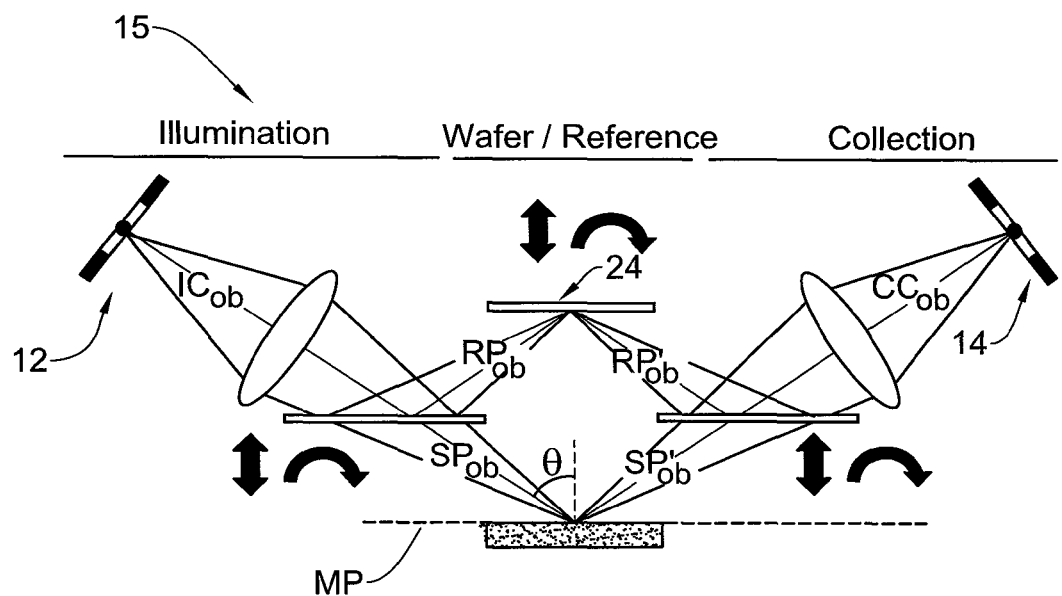

FIGS. 12C and 12D show yet other degree of freedom configurations. FIG. 12C is a general asymmetric configuration with the beam splitter combiner 22 in the form of spaced-apart separate splitting and combining elements 22A and 22B (staggered individual beam splitter configuration in FIG. 12C and individual beam splitter configuration in FIG. 12D). Degrees of freedom may be placed on the reference mirror 24 (z+tip/tilt movement), or on all components, as shown in FIG. 12D. The most general form is to provide degrees of freedom (z+tip/tilt) on each individual component, including separate beam-splitters for the illumination and collection paths. This ensures the maximal flexibility at the price of added system complexity.

Figure 10B:
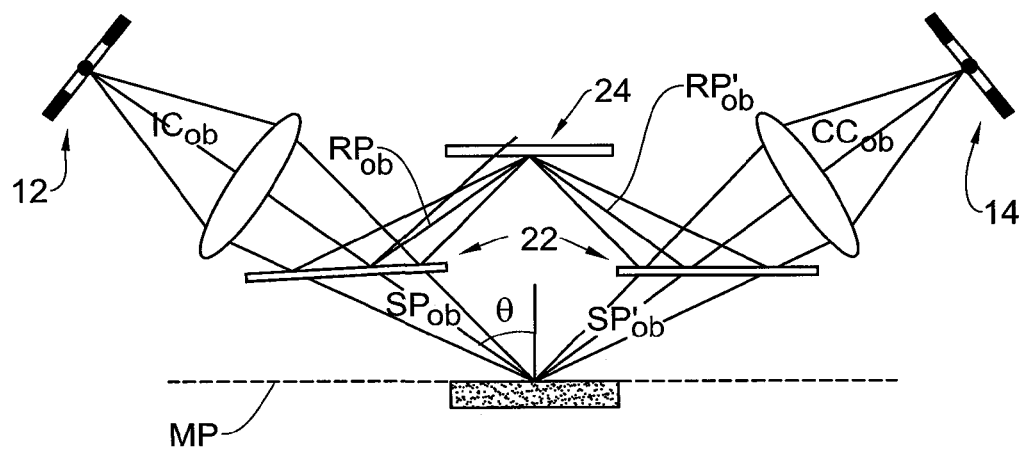

As described above, the reference reflector 24 may be used to compensate for deviations from the nominal geometry of the beam splitting/combining plates 22A and 22B, as well as rotational positioning errors of these plates (as shown in FIG. 10B), and tip/tilt of the measurement plane (sample's stage). Rotational movement of the beam splitter component causes lateral displacement (Δx) of the beam on the reference mirror. Tilt of the reference mirror is mainly used to align the reference reflector to the sample plane. If the configuration is asymmetric (where the image plane is not on the reference mirror) this also affects lateral alignment between the beams, i.e. the tilt and lateral displacement degrees-of-freedom are coupled.

FIGS. 13A and 13B exemplify how errors in the thickness (FIG. 13A) or wedge (FIG. 13B) of the beam splitting/combining plate 22 may be compensated by, respectively, the z-axis movement of the reference reflector 24 or the tip/tilt thereof with respect to the normal plane. Plate wedge, as well as tip/tilt of the plate or of the measurement plane might cause a change of the OPD across the field-of-view (FOV), i.e. position dependent plate thickness. The OPD should be uniform across the FOV, so that the same fringe is observed across the entire field. The tip/tilt of the reference reflector can be used to maximize the OPD uniformity across the FOV.

It should be understood that the above specific examples are not limiting, and similar techniques may be used to compensate for tolerances on other components (reference mirror thickness/wedge, prism surface misalignment, etc.) depending on the design.

It should also be noted that the compensation provided by the controllable fine movement of the reference reflector might not be optimal, as there are two residual effects that might impact overall coherence. These effects happen when the optical paths of the sample and reference arms do not have exactly the same propagation lengths in free-space and in the pellicle's media (e.g. glass).

In this connection, reference is made to FIGS. 14A and 14B illustrating the principles temporal coherence reduction by longitudinal color introduced by the reference reflector compensation. As shown in FIG. 14A, the reflector enables to compensate for one wavelength $\lambda_1$, but dispersion in the beam splitter/combiner medium causes an OPD mismatch at other wavelengths $\lambda_2$. More specifically, OPD match at wavelength $\lambda_1$ satisfies a condition:

$$t_s n(\lambda_1) + l_s = t_R n(\lambda_1) + l_R$$

and OPD mismatch at $\lambda_2$ does not satisfy the condition:

$$t_s n(\lambda_2) + l_s \neq t_R n(\lambda_2) + l_R$$

This is because the refractive index of the media of the beam splitter/combiner plate(s) is a function of wavelengths, and accordingly optical paths for light components of different wavelengths are different.

As shown in FIG. 14B, another effect that might occur is associated with residual focus errors. OPD match and focus mismatch are:

$$t_S n + l_S = t_R n + l_R$$

$$t_S \frac{(n-1)}{n} + l_S \neq t_R \frac{(n-1)}{n} + l_R$$

If OPD is compensated at a certain wavelength, different propagation lengths in air/glass between the arms will cause their spots to focus at different depths, leading to coherence degradation. On the other hand, if a match of the spots' focus depths is required, then an OPD error occurs. Due to the oblique geometry, z-axis displacement of the reference reflector is strongly coupled to boresight between both paths, limiting the available of z-axis compensation.

Thus, the oblique interferometric measurements require alignment of paths with respect to beam position and angle, and match of the optical path length (OPL) of the reference and sample paths. As described above, in the basic oblique spectral interferometric scheme, these requirements can be met by controllable z-axis displacement (course) the sample stage (measurement plane) to bring the sample into focus in the sample arm, and fine tuning by (tip/tilt+z) controllable displacement of either one of reflecting and partially reflecting surfaces, to ensure alignment and OPL requirements. Such reflecting or partially reflecting surfaces include beam splitting/combining surface(s), and reference reflecting surface(s), as well as reflective surfaces of folding mirrors if used. The tip/tilt displacement of either one of these surfaces can be implemented using for example MEMS-type 2-axis mirror/reflector. The s-axis displacement of a folding reflector can be part of MEMS mechanism or an additional mechanism.

FIGS. 15A to 15D exemplify various degree of freedom configurations for the oblique spectral interferometric system 15 using folding reflectors 48A and 48B associated with the reference arm to enable selective shift of the system operation from the oblique spectral interferometric mode to the oblique spectral reflectometric mode.

Figure 15A:
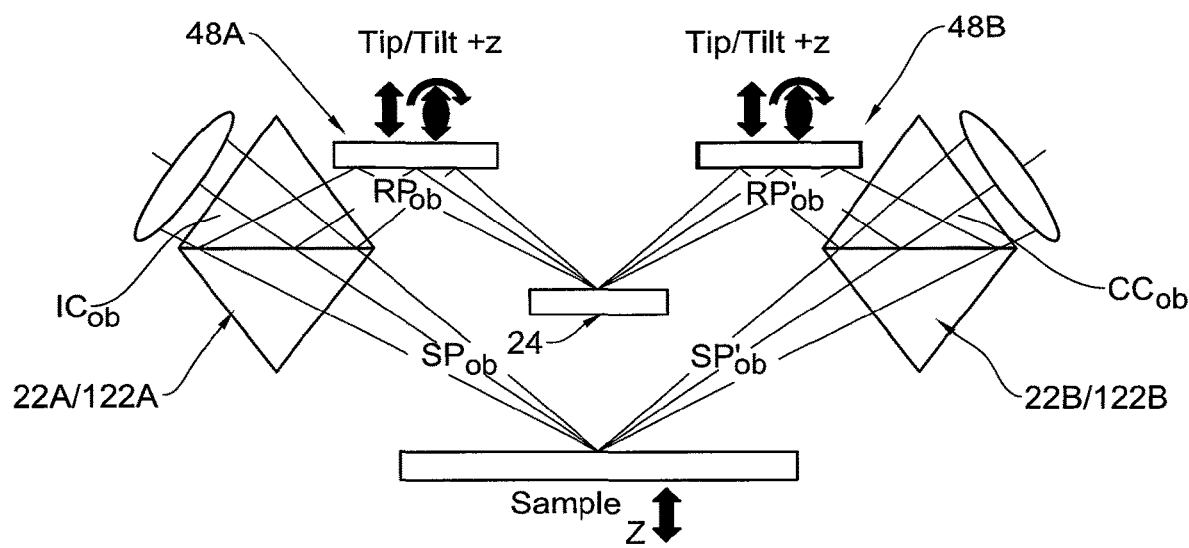
FIGS. 15A to 15D exemplify various degree of freedom configurations for the oblique spectral interferometric system using folding reflectors associated with the reference arm to enable alignment of reference and sample beams, in terms of boresight, chief-ray angular alignment and OPD. These degrees of freedom may also be used to selectively shift of the system operation from the oblique spectral interferometric mode to the oblique spectral reflectometric mode by throwing the reference beam out of the collection path (preferably to a controlled beam dump)

In the example of FIG. 15A, the controllable driving mechanisms are used (not shown here) being associated with the sample's stage for z-axis displacement of the measurement plane MP, and with the folding mirrors 48A and 48B for tip/tilt (e.g. MEMs) and z-axis displacement of each of the folding mirrors 48A and 48B. The tip and tilt displacement are, respectively, tip in the incidence plane with respect to (about) the normal plane and tilt in the normal plane (tilt axis is parallel to plane of incidence).

Figure 15B:
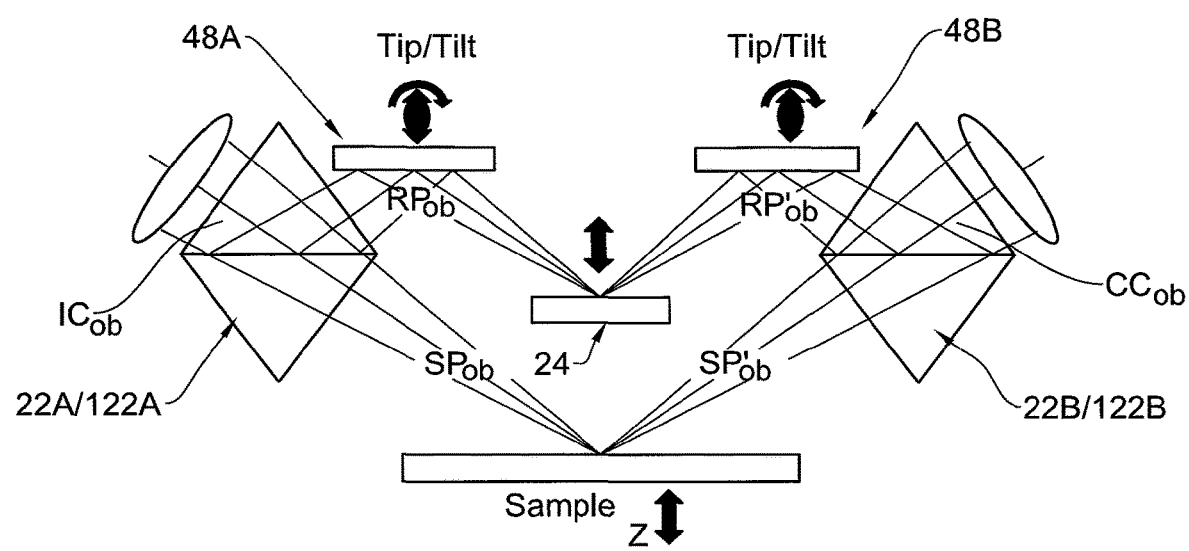

In the example of FIG. 15B, the driving mechanisms are associated with the sample's stage for z-axis displacement of the measurement plane MP, with the folding mirrors 48A and 48B for the above-described tip/tilt (MEMs) displacement of each of the folding mirrors 48A and 48B, and with the reference reflector 24 for z-axis displacement thereof. Thus, here, the z-axis displacement of the folding mirrors 48A and 48B is replaced by the z-axis displacement of the reference reflector 24.

Figure 15C:
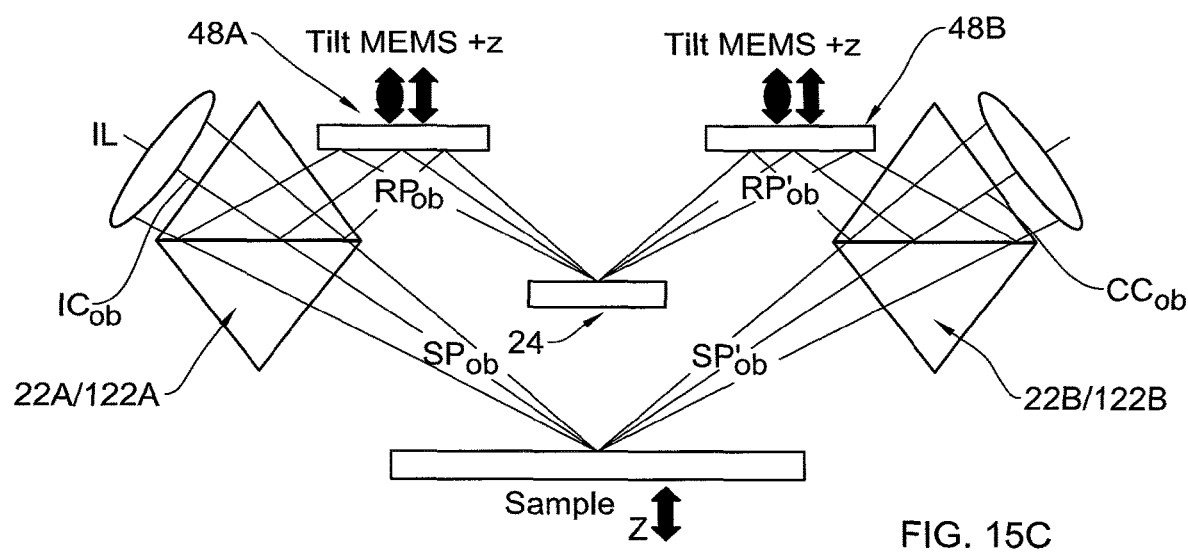
Figure 15D:
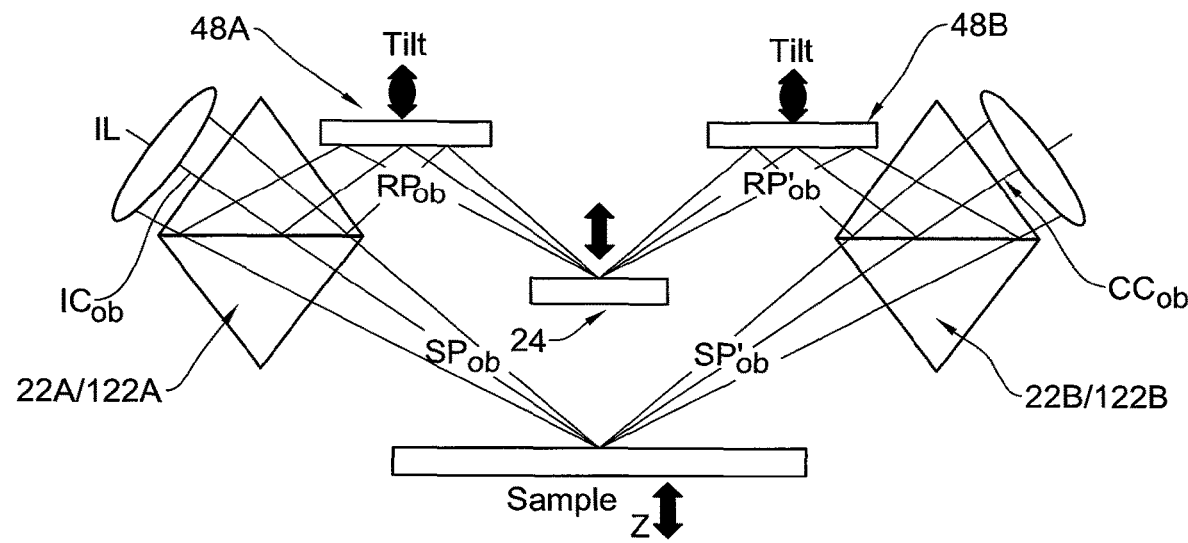

In the example of FIG. 15C, the z-axis displacement of the measurement plane is used, and z-axis displacement and normal plane tilt (e.g. MEMs) of each of the folding mirrors 48A and 48B is used. Thus, here, the residual misalignment can be compensated by a combination of z-axis displacement of the sample and reference arm via displacement of the folding mirrors 48A and 48B. In the example of FIG. 15D, the z-axis displacement of the folding mirrors in configuration of FIG. 15C is replaced by z-axis displacement of the reference reflector 24. It should, however be noted that z-displacement of the reference reflector may be used in addition to the z-displacement of the folding mirrors. Thus, generally, the residual misalignment can be compensated by a combination of z-axis displacement of the sample and the reference arm, where the latter is achieved by z-displacement of the reference reflector and/or the folding mirrors.

Figure 16:
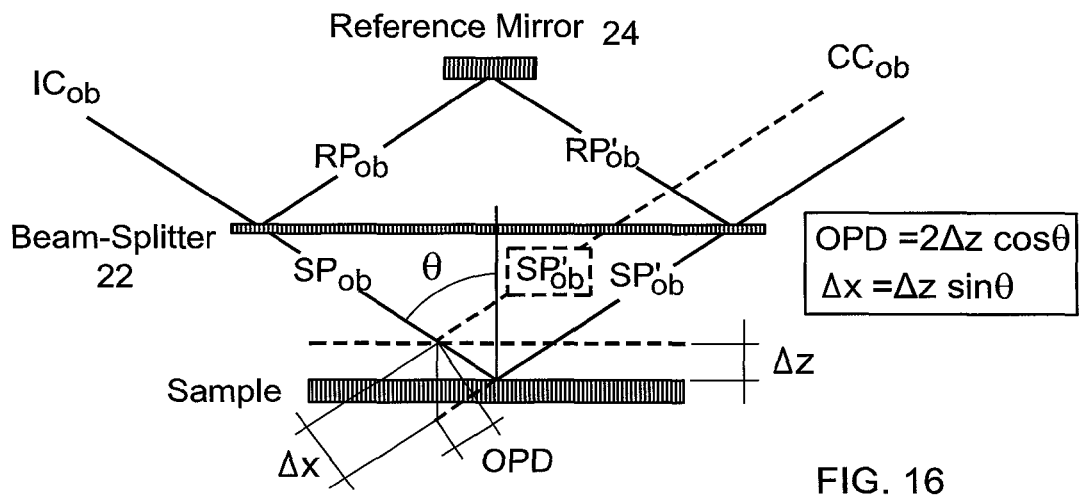
FIG. 16 illustrates how a change of the OPD in the interferometer impacts the beam alignment boresight.

It should be noted that degrees of freedom allow scan on the OPD without changing beam alignment. Phase recovery from the detected interference fringes usually requires a controlled change of the phase difference between the interferometer's arms, usually by changing the OPD accumulated between the arms. In a standard oblique Mirau configuration, changing the OPD also impacts the beam alignment boresight. This is schematically illustrated in FIG. 16 in a self-explanatory manner: a Δz displacement of the measurement plane MP results in Δx difference between the reference and sample arms (the sample arm is by Δx shorter than the reference arm).

Such OPD can reduce coherence and the contrast of the interference fringes, in some cases to a point where the interference fringes are barely visible and/or more strongly affected by system noise, thereby reducing measurement accuracy.

The folded oblique interferometric configuration of the invention (i.e. the above described configurations using folding mirrors) overcomes this limitation, by allowing a controlled change of OPD whilst maintaining precise beam alignment, i.e. incidence of the reflected reference and sample beams onto the overlapping region of the combining surface. This is exemplified in FIGS. 17A-17E showing an embodiment where the images from the reference and sample path are precisely aligned on the detector image plane.

Figure 17A:
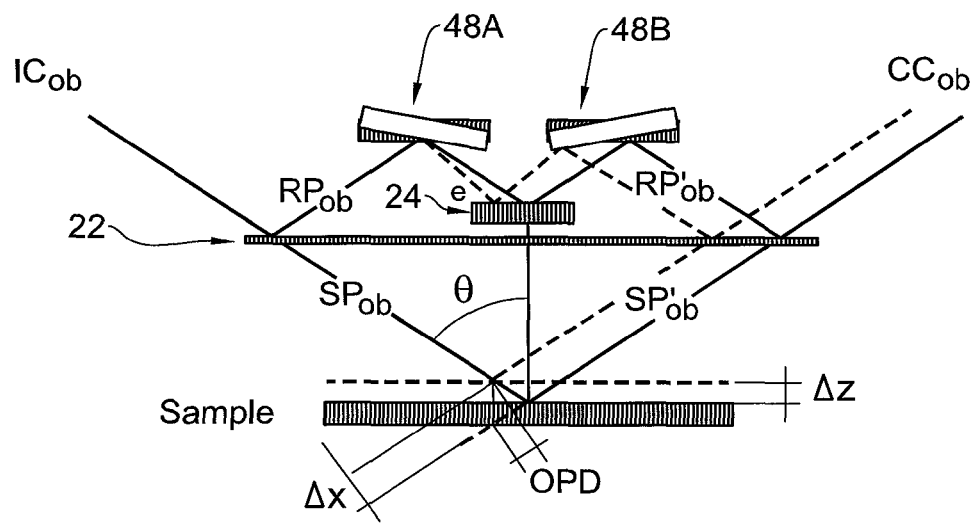
FIGS. 17A to 17E exemplify folded oblique interferometric configurations allowing a controlled change of OPD whilst maintaining precise beam alignment.

As shown in FIG. 17A, the Δz displacement of the measurement plane is compensated by a tilt of each of the folding mirrors 48A and 48B in the incident plane with respect to the normal plane. In this example, the folding mirrors 48A and 48B are similarly shifted in the opposite directions, to maintain the symmetrical configuration of the interferometric unit (light propagation therethrough) with respect to the normal plane. Thus, for example a tilt of each of the folding mirrors 48A and 48B is such that it shortens the reference arm by Δx/2 length, thus equalizing the optical lengths of the reference and sample arms.

Figure 17B:
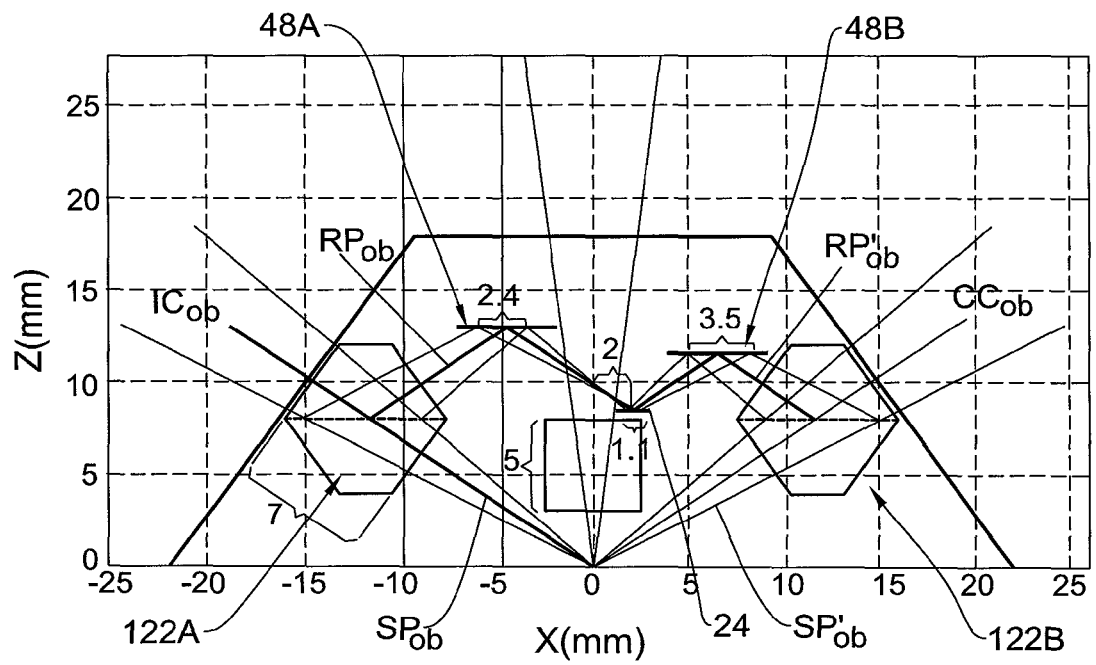

FIG. 17B illustrates the light propagation scheme in the system configuration embodiment utilizing a combination of oblique spectral interferometric mode (when folding mirror (s) 48A and/or 48B is/are operative), normal spectral interferometric mode, and oblique and normal reflectometric modes (when, respectively, the folding mirrors 48A and 48B are inoperative and the normal-channel beam interferometric unit 122 is inoperative). As shown, the reference reflector 24 is located with a certain offset with respect to the normal plane, similar to the above-described example of FIG. 9F. This affects the length of the reference arm, and the so-induced difference between the reference and sample arms can be compensated by z-displacement of at least one of the folding mirrors 48A and 48B such that they are located in spaced-apart parallel planes.

Figure 17C:
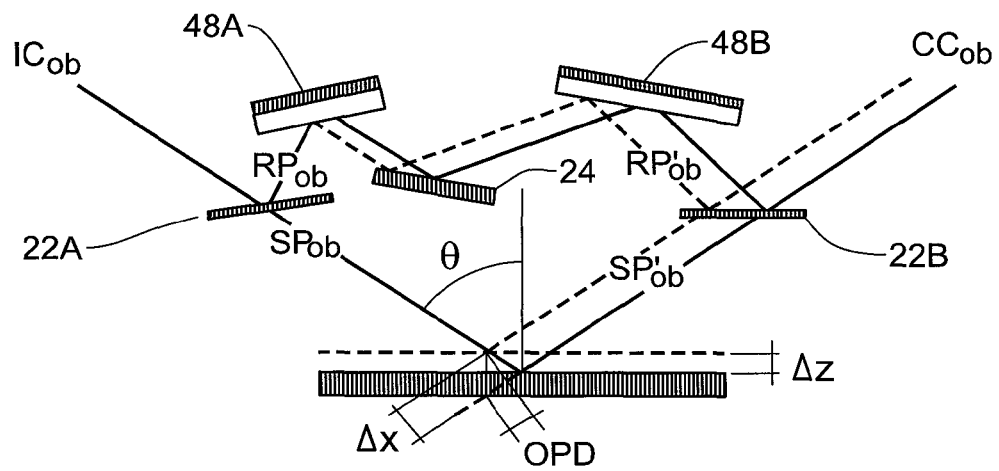
Figure 17D:
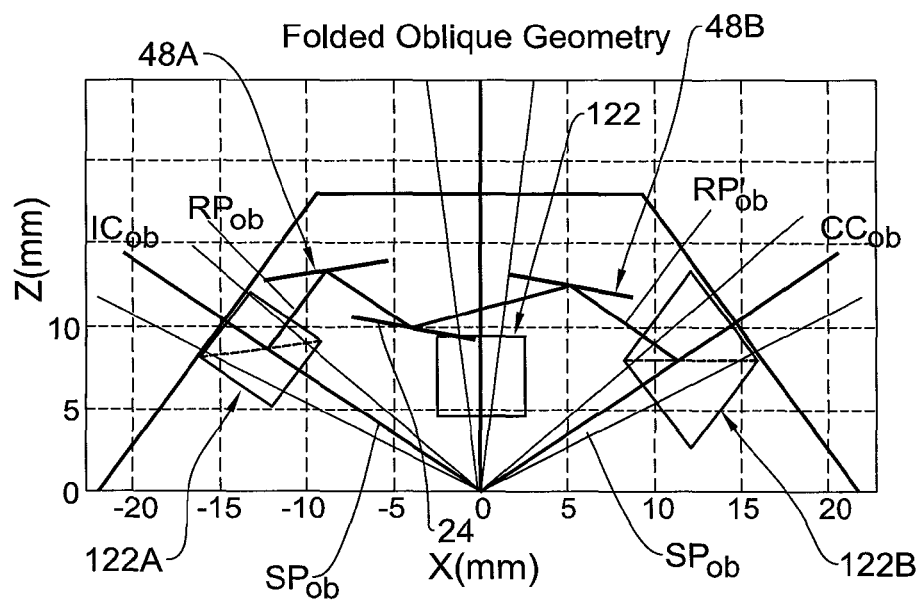
Figure 17E:
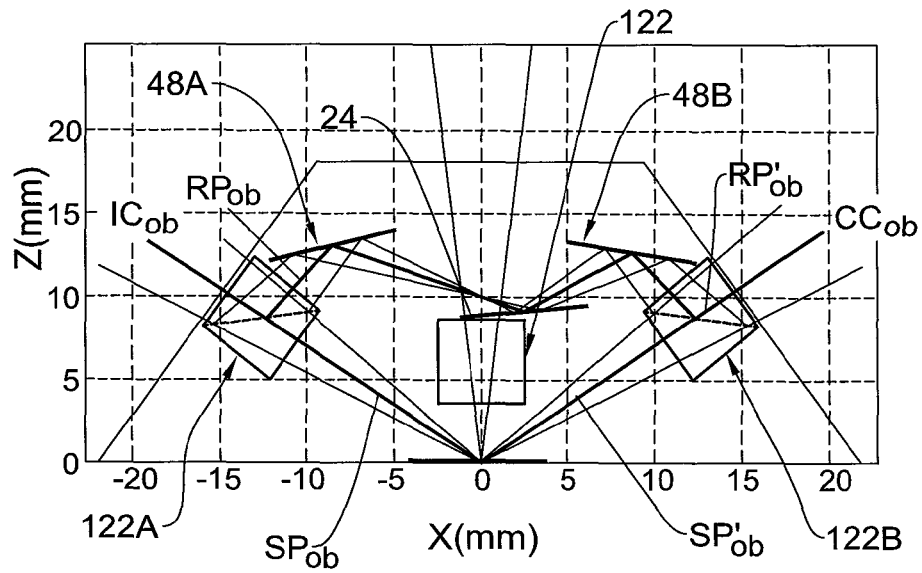

In the offset-configuration example of FIG. 17B, the reflecting surfaces of the folding mirrors and reference mirror are located in spaced-apart parallel planes. FIGS. 17C, 17D and 17E illustrate three different examples, respectively, utilizing the offset position of the reference reflector 24 (with respect to the normal plane) and compensation of the so-induced OPD by proper tilt of the reflecting surfaces of the reference 24 and folding reflectors 48A and 48B.

More specifically, as shown in FIG. 17C, the Δz displacement of the measurement plane MP and correspondingly induced Δx difference between the reference and sample arms (sample arm becomes shorted than the reference arm) is compensated by properly shortening the reference arm using controllable displacement (piston) of each of the folding mirrors 48A and 48B and the reference reflector 24. The reference reflector 24 is located with a certain offset with respect to the normal plane, and the reference reflector 24 and folding reflectors 48A and 48B are located at different height (z-axis) positions. Thus, for example, the folding mirrors 48A and 48B are displaced (piston movement) to compensate for the lateral displacement Δx, whilst also compensating for OPD. This is possible since the folding mirrors 48A and 48B and the reference mirror 24 (i.e., their reflective surfaces) are not parallel. In this example, the folding mirrors 48A and 48B are displaced in opposite directions, i.e. the left-hand mirror 48A is moved downwards, while the right-hand mirror 48B is raised. The exact amounts are readily calculated from the folding geometry.

It should be noted. Although not specifically shown) that it is also possible to compensate for Δx and OPD effects by using a folding mirror tilt in a manner analogous to that shown in FIG. 17A.

FIGS. 17D and 17E schematically illustrate generally similar configurations but further modified to enable combination of the oblique spectral interferometric scheme with normal spectral interferometric scheme.

Thus, the present invention provides a novel measurement system which utilizes at least oblique spectral interferometric system enabling to extract phase information of the specular reflection from the sample, which provides desired information about the patterned surface of the sample. Preferably, the oblique spectral interferometric system is configured to allow its modification into an oblique spectral reflectometric system, and also to allow addition of a normal channel system, operable in either one or both of spectral interferometric and reflectometric modes.

The invention claimed is:

1. A measurement system for use in metrology measurements on patterned samples, the system comprising:
    at least one light source device configured to generate broadband light,
    at least one detection device configured to provide spectral information of detected light, and
    an optical system comprising at least an oblique channel system configured to direct incident light generated by said at least one light source along an oblique illumination channel onto a measurement plane, on which a sample is to be located, and to direct broadband light specularly reflected from the sample along a collection channel to said at least one detection device, wherein said optical system comprises an interferometric unit comprising a beam splitting/combining device and a reference reflector device, the beam splitting/combining device being accommodated in said illumination and collection channels and configured to divide light propagating in the illumination channel into sample and reference light beams propagating in sample and reference paths, and combine reflected reference and sample paths into the collection channel to thereby create a spectral interference pattern on a detection plane defined by said at least one detection device,
    the measurement system is configured to be selectively shiftable between the oblique spectral interferometric mode and oblique spectral reflectometric mode.

2. The system of claim 1, wherein said beam splitting/combining device is configured to define at least one beam splitting surface and at least one beam combining surface located in different planes which are spaced-apart along an axis normal to the measurement plane and substantially parallel to one another and to the measurement plane and a plane of a reference reflective surface of the reference reflector device.

3. The system of claim 1, wherein said beam splitting/combining device is configured to define at least one beam splitting surface and at least one beam combining surface located in the same plane substantially parallel to the measurement plane and to a plane of a reference reflective surface of the reference reflector device.

4. The system of claim 3, wherein the interferometric unit is configured such that the sample and reference paths form a mirror image of the reflected sample and reference paths with respect to said plane containing the beam splitting and combining surfaces.

5. The system of claim 3, wherein the interferometric unit is configured such that the sample and reference paths form a mirror image of the reflected sample and reference paths with respect to a normal plane, which is perpendicular to the measurement plane and to an incidence plane.

6. The system of claim 1, wherein said beam splitting/combining device is configured to define at least one beam splitting surface and at least one beam combining surface located in spaced-apart relationship and oriented substantially symmetrically with respect to a normal plane, which is perpendicular to the measurement plane and to an incidence plane.

7. The system of claim 1, wherein the beam splitter/combiner device comprises at least one pellicle structure comprising at least one partially-reflective region.

8. The system of claim 1, further configured to be selectively shiftable between the oblique spectral interferometric mode and normal-mode reflectometric measurements.

9. The system of claim 1, comprising a light blocking mechanism controllably operable to selectively block the reference path.

10. The system of claim 1, further configured to perform normal-mode spectral interferometric measurements.

11. The system of claim 1, wherein said optical system further comprises one or more folding reflecting surfaces located in at least one of the reference and reflected reference paths, thereby enabling selective operation of the system in either one of the oblique spectral interferometric mode, oblique spectral reflectometric mode, normal spectral interferometric mode, and normal spectral reflectometric mode.

12. The system of claim 1, further comprising one or more driving mechanisms for controllably displacing at least one of the following: displacing the measurement plane along a normal axis; and displacing at least one of reflecting and partially reflecting surfaces of the optical unit; said at least one controllable displacement enabling at least one of the following: adjust an optical path difference between reference and sample arms in the interferometric unit; and adjust a shift of the system operation from a spectral oblique interferometric mode to the oblique spectral reflectometric mode.

13. The system of claim 1, further comprising a control unit configured and operable to receive and process measured data from said at least one detection device, and to operate one or more driving mechanisms for controllably displacing at least one of the following: displacing the measurement plane along a normal axis; and displacing at least one of reflecting and partially reflecting surfaces of the optical system; said at least one controllable displacement enabling at least one of the following: adjust an optical path difference between reference and sample arms in the interferometric unit; and adjust a shift of the system operation from a spectral oblique interferometric mode to the oblique spectral reflectometric mode.

14. A measurement system for use in metrology measurements on patterned samples, the system comprising:
at least one light source device configured to generate broadband light,
at least one detection device configured to provide spectral information of detected light, and
an optical system comprising at least an oblique channel system configured to direct incident light generated by said at least one light source along an oblique illumination channel onto a measurement plane, on which a sample is to be located, and to direct broadband light specularly reflected from the sample along a collection channel to said at least one detection device, wherein said optical system comprises an interferometric unit comprising a beam splitting/combining device and a reference reflector device, the beam splitting/combining device being accommodated in said illumination and collection channels and configured to divide light propagating in the illumination channel into sample and reference light beams propagating in sample and reference paths, and combine reflected reference and sample paths into the collection channel to thereby create a spectral interference pattern on a detection plane defined by said at least one detection device,
the measurement system is configured to be selectively shiftable between the oblique spectral interferometric mode and normal-mode reflectometric measurements.

15. The system of claim 14, configured to concurrently perform the oblique spectral interferometric mode and the normal-mode spectral interferometric measurements.

16. A measurement system for use in metrology measurements on patterned samples, the system comprising:
at least one light source device configured to generate broadband light,
at least one detection device configured to provide spectral information of detected light, and
an optical system comprising at least an oblique channel system configured to direct incident light generated by said at least one light source along an oblique illumination channel onto a measurement plane, on which a sample is to be located, and to direct broadband light specularly reflected from the sample along a collection channel to said at least one detection device, wherein said optical system comprises an interferometric unit comprising a beam splitting/combining device and a reference reflector device, the beam splitting/combining device being accommodated in said illumination and collection channels and configured to divide light propagating in the illumination channel into sample and reference light beams propagating in sample and reference paths, and combine reflected reference and sample paths into the collection channel to thereby create a spectral interference pattern on a detection plane defined by said at least one detection device,
the measurement system is further configured to perform normal-mode spectral interferometric measurements.

17. The system of claim 16, wherein said optical system further comprises a normal channel system defining normal-mode illumination and collection channels.

18. The system of claim 17, wherein said beam splitter/combiner device comprises beam splitting and beam combining surfaces accommodated in the oblique and normal illumination channels and the oblique and normal collection channels.

19. The system of claim 18, wherein said reference reflector device comprises reflecting surfaces located in respectively the oblique reference path and a normal reference path.

20. The system of claim 17, wherein said optical system further comprises a normal channel beam splitter/combiner device.

21. The system of claim 17, wherein said reference reflector device comprises at least one reflecting surface located in the oblique reference path and in a normal reference path.

* * * * *